(12) United States Patent  (10) Patent No.: US 9,262,012 B2
Hwang et al.  (45) Date of Patent: Feb. 16, 2016

(54) HOVER ANGLE

(71) Applicant: Microsoft Corporation, Redmond, WA (US)

(72) Inventors: Dan Hwang, New Castle, WA (US);
Lynn Dai, Samamish, WA (US);
Muhammad Usman, Bellevue, WA (US)

( * ) Notice: Subject to any disclaimer, the term of this patent is extended or adjusted under 35 U.S.C. 154(b) by 108 days.

(21) Appl. No.: 14/147,085

(22) Filed: Jan. 3, 2014

(65) Prior Publication Data

US 2015/0193040 A1 Jul. 9, 2015

(51) Int. Cl.
G06F 3/033 (2013.01)
G06F 3/042 (2006.01)
G06F 3/0488 (2013.01)
G06F 3/0484 (2013.01)

(52) U.S. Cl.
CPC ............ *G06F 3/042* (2013.01); *G06F 3/04883* (2013.01); *G06F 3/04842* (2013.01); *G06F 2203/04108* (2013.01)

(58) Field of Classification Search
CPC ..... G06F 3/033; G06F 3/0338; G06F 3/0346; G06F 3/03545; G06F 3/041; G06F 3/0416; G06F 3/0487; G06F 3/0488; G06F 2203/0382; G06F 2203/04108
See application file for complete search history.

(56) References Cited

U.S. PATENT DOCUMENTS 6,184,873 B1 * 2/2001 Ward et al. ............... 345/179
6,803,906 B1 * 10/2004 Morrison et al. ......... 345/173
8,502,804 B2 8/2013 Kolmykov-Zotov
8,515,128 B1 8/2013 Hildreth
8,593,418 B2 * 11/2013 Blow et al. ............... 345/173
8,604,364 B2 * 12/2013 Simon et al. .............. 178/18.03

(Continued)

FOREIGN PATENT DOCUMENTS

EP 2128748 A2 12/2009
EP 2230589 A1 9/2010

(Continued)

OTHER PUBLICATIONS

"International Search Report and Written Opinion Issued in PCT Patent Application No. PCT/US2014/071779", Mailed Date: Apr. 28, 2015, 12 Pages.

(Continued)

*Primary Examiner* — Joe H Cheng
(74) *Attorney, Agent, or Firm* — Timothy Churna; Leonard Smith; Micky Minhas

(57) ABSTRACT

Example apparatus and methods concern detecting an angle at which an object is interacting with a hover-sensitive input/output interface. An example apparatus may include a proximity detector configured to detect an object in a hover-space associated with the hover-sensitive input/output interface. The proximity detector may provide three dimensional position information for the object (e.g., x,y,z). The angle may be determined from a first (x,y,z) measurement associated with a first portion (e.g., tip) of the object and a second (x,y,z) measurement associated with a second portion (e.g., end) of the object. The position of the object may determine a hover point on the interface while the position and angle may determine an intersection point on the interface. User interface elements or other information displayed on the interface may be manipulated based, at least in part, on the intersection point. Multiple objects interacting at multiple angles may be detected and responded to.

20 Claims, 21 Drawing Sheets

(56) References Cited

U.S. PATENT DOCUMENTS

| | | | |
|---|---|---|---|
| 2004/0160429 A1* | 8/2004 | Blake et al. ................ 345/179 |
| 2005/0091297 A1* | 4/2005 | Sato et al. ................ 708/442 |
| 2009/0122022 A1* | 5/2009 | Park et al. ................ 345/173 |
| 2009/0167702 A1* | 7/2009 | Nurmi ................ 345/173 |
| 2010/0315413 A1* | 12/2010 | Izadi ................ G06F 3/017 |
| | | 345/419 |
| 2011/0018827 A1* | 1/2011 | Wang et al. ................ 345/173 |
| 2011/0202835 A1* | 8/2011 | Jakobsson et al. ................ 715/702 |
| 2011/0260998 A1* | 10/2011 | Ludwig ................ 345/173 |
| 2012/0102436 A1* | 4/2012 | Nurmi ................ G06F 1/1613 |
| | | 715/863 |
| 2012/0192119 A1* | 7/2012 | Zaliva ................ 715/863 |
| 2012/0327042 A1 | 12/2012 | Harley |
| 2013/0088465 A1* | 4/2013 | Geller et al. ................ 345/179 |
| 2013/0141388 A1* | 6/2013 | Ludwig et al. ................ 345/174 |
| 2013/0342459 A1* | 12/2013 | Karakotsios et al. ......... 345/159 |
| 2015/0160819 A1* | 6/2015 | Hwang et al. ......... G06F 3/0486 |

FOREIGN PATENT DOCUMENTS

| | | |
|---|---|---|
| WO | 2011154950 A1 | 12/2011 |
| WO | 2013192454 A2 | 12/2013 |

OTHER PUBLICATIONS

"Second Written Opinion issued in PCT Application No. PCT/US2014/071779", Mailed Date: Dec. 3, 2015, 8 Pages.

* cited by examiner

HOVER ANGLE

BACKGROUND

Touch-sensitive and hover-sensitive screens typically report the presence of an object using an (x,y) co-ordinate for a touch-sensitive screen and an (x,y,z) co-ordinate for a hover-sensitive screen. Some touch-sensitive screens may also report an inferred angle of incidence between an object and a screen. This angle of incidence may be used to estimate direction information associated with the object. For example, a conventional model may describe a finger touching a screen using five parameters (e.g., x, y, w, θp, θy) as illustrated in FIG. 21. While the x and y information may have been based on actual touch sensors, the w, θp, and θy information may have been inferred or estimated. However, these inference-based systems may have produced ambiguities in estimating positions based on contact location and shape, or based on a finger landing process, or based on Euler angles and geometry.

Touch-sensitive screens may then have taken actions based on the inferences concerning an intended touch point and the estimated position of a finger producing the intended touch point. For example, based on the inferences or estimations, text on a screen may have been wrapped around an area that may have been estimated to be occluded by the finger. Conventionally, attempts to detect finger angle may have required sensors located external to the screen. For example, a set of cameras that are positioned to image the area above the screen may have been employed to detect the angle of a finger. Or, conventional systems may have relied on detecting both a physical contact of a stylus as well as the proximity of other portions of a stylus. The use of external cameras or other external systems may have limited conventional systems to fixed table-top systems.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards detecting a pitch of an object in a hover space associated with a portable (e.g., handheld) device (e.g., phone, tablet). The pitch may be determined based, at least in part, on actual measurements from sensors located in device producing the hover space. The sensors may identify one or more points associated with the object that is not touching the interface. An angle between the object and the hover-sensitive screen may be determined from the multiple points. A hover point may be associated with the (x,y) location of one point (e.g., the tip of the object) and an intersection point may be associated with a second (x,y) location corresponding to a projection of the object along its orientation at the detected angle. The intersection point may be determined using the (x,y,z) location of the tip of the object along with angle information. Determining the hover point and the intersection point along with the pitch of the object may facilitate improving the user interface experience for a hover-sensitive device. For example, touch/tap accuracy may be enhanced by allowing for dynamic hit-target resizing. This dynamic hit-target resizing may be employed to improve, for example, an on-screen virtual keyboard, or on-screen user-interface elements. In another example, the hover point, intersection point, and pitch may be used to control the placement or appearance of data or user interface elements on a screen. For example, elements that would be occluded by the object may be moved to regions where the elements would not be occluded. Or, elements that would be occluded by the object may be de-sensitized to touch or hover events because it is unlikely that a user intended to activate a user-interface element that could not be seen.

Some embodiments may include logics that detect (x,y,z) position information for portions of an object in a hover space. The logics may maintain orientation and angle information based on the (x,y,z) information. For example, (x,y,z) information for two or more points on an object may be acquired. The orientation of the object producing the hover point and intersection point may be determined from just the (x,y) information. The pitch angle may be determined from the (x,y,z) information. While conventional systems may have inferred information for an object based on a single touch point, example systems are not so limited. Some embodiments may disambiguate (x,y,z) information for multiple objects located in the hover space. Orientation and angle information may then be determined from the actual measurements acquired for the multiple objects. For example, a user may use two fingers to point to a single intersection point or may use a first finger to establish an intersection point and may use a second finger to trace an arc or other path from the intersection point. Thus, example systems may not just infer angle information from a touch point, but may take actions based on orientation and angle information associated with actual measurements acquired from one or more objects located in a hover space.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
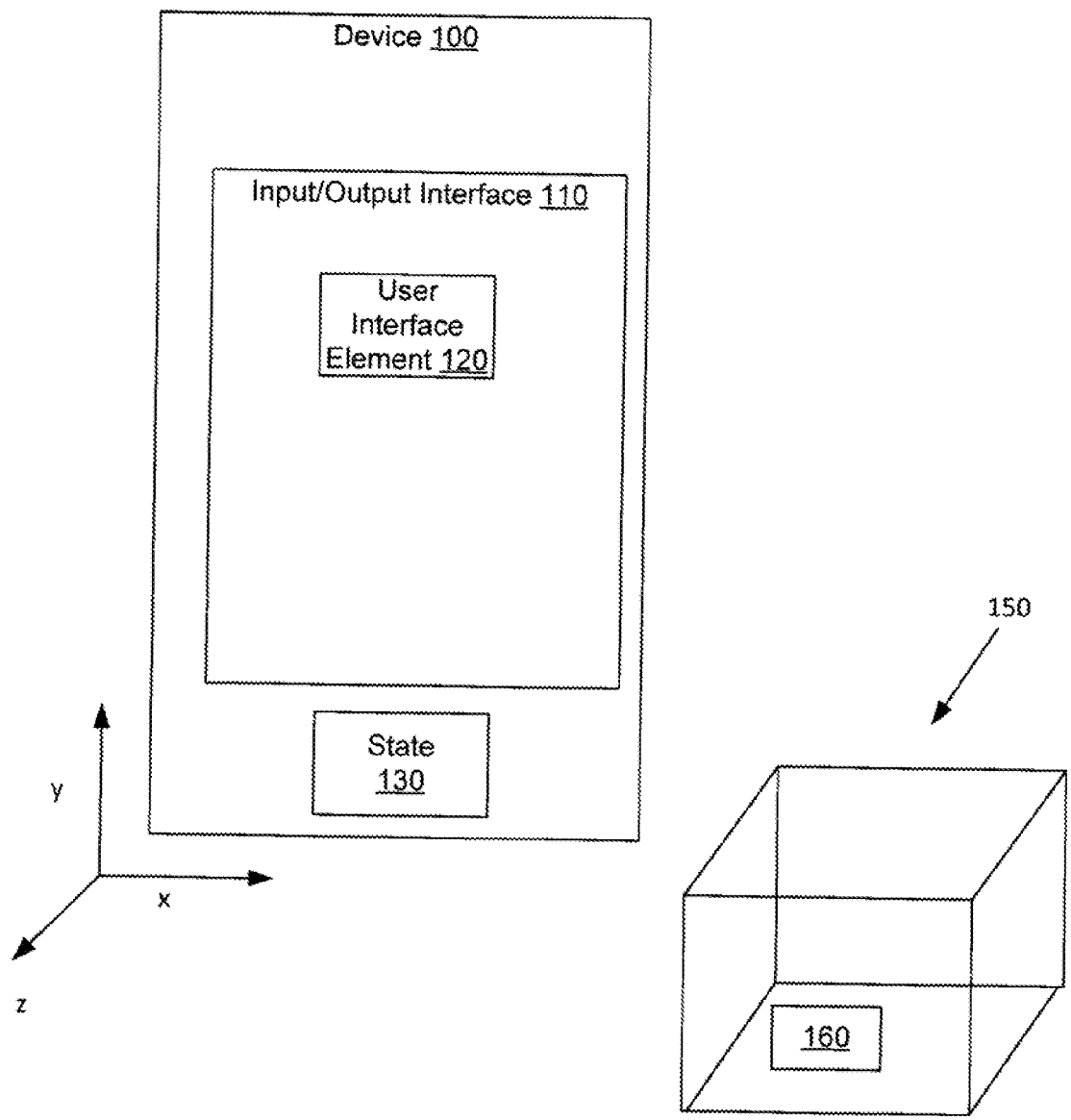
FIG. 1 illustrates an example hover-sensitive device.

Example apparatus and methods concern detecting a pitch of an object in a hover space associated with a portable (e.g., handheld) device (e.g., phone, tablet). Detecting the pitch may include, for example, detecting an angle at which the object is interacting with the portable device. The angle may be determined from actual measurements from sensors located in the portable device. A hover point on the device may be associated with the (x,y) location of one point (e.g., the tip) of the object. An intersection point on or off the device may be associated with a second (x,y) location corresponding to a projection of the object along its orientation at the detected angle. The detected angle may be based, for example, on a set of (x,y,z) measurements associated with the object. The intersection point may be determined using the (x,y,z) location of the tip of the object along with detected angle.

Determining the hover point and the intersection point based on the pitch of the object may facilitate improving the user interface experience for a hover-sensitive device. For example, touch/tap accuracy may be enhanced by reconfiguring the user interface on the hover-sensitive device. Reconfiguring the user interface may include, for example, dynamically resizing a hit-target to make it easier to hit the intended target. This dynamic hit-target resizing may be employed to improve, for example, an on-screen virtual keyboard so that keys that are in the intended path of the object are made larger while irrelevant keys that are not in the intended path are made smaller. The intended path may be computed from the position of the object and the intersection point. Similarly, on-screen user-interface elements that are in the intended path of the object may be enhanced while user-interface elements that are occluded or not in the intended path may be diminished.

In one example, the hover point, intersection point, and orientation may be used to control the placement or appearance of data or user interface elements on a screen. For example, elements that would be occluded by the object may be moved to regions where the elements would not be occluded. Or, elements that would be occluded by the object may be de-sensitized to touch or hover actions because it is unlikely that a user would intend to activate a user-interface element that could not be seen. Occlusion may not be a function of just where an object is located, but also the point of view from which the device is being viewed, the number of objects being used to interact with the device, and the relationship between the objects and the point of view.

A user may interact with a device using one finger, two fingers, a finger and a stylus, or other combinations of digits and apparatus. Therefore, example apparatus and methods may acquire and track orientation and pitch angle information from the actual measurements acquired for the multiple objects. For example, a user may use two fingers to point to a single intersection point or may use a first finger to establish an intersection point and may use a second finger to trace an arc or other path from the intersection point. Thus, example apparatus and methods may take actions based on orientation and pitch angle information associated with actual measurements acquired from one or more objects located in a hover space.

Hover technology is used to detect an object in a hover-space. "Hover technology" and "hover-sensitive" refer to sensing an object spaced away from (e.g., not touching) yet in close proximity to a display in an electronic device. "Close proximity" may mean, for example, beyond 1 mm but within 1 cm, beyond 0.1 mm but within 10 cm, or other combinations of ranges. Being in close proximity includes being within a range where a proximity detector can detect and characterize an object in the hover-space. The device may be, for example, a phone, a tablet computer, a computer, or other device. Hover technology may depend on a proximity detector(s) associated with the device that is hover-sensitive. Example apparatus may include the proximity detector(s).

FIG. 1 illustrates an example hover-sensitive device 100. Device 100 includes an input/output (i/o) interface 110. I/O interface 110 is hover-sensitive. I/O interface 110 may display a set of items including, for example, a user interface element 120. User interface elements may be used to display information and to receive user interactions. Hover user interactions may be performed in the hover-space 150 without touching the device 100. Touch interactions may be performed by touching the device 100 by, for example, touching the i/o interface 110. Device 100 or i/o interface 110 may store state 130 about the user interface element 120 or other items that are displayed. The state 130 of the user interface element 120 may depend on the orientation and pitch of object 160. The state 130 may include, for example, the location of a hover point on the i/o interface 110, the location of an intersection point on or near the interface 110, or other information. The state information may be saved in a computer memory.

The device 100 may include a proximity detector that detects when an object (e.g., digit, pencil, stylus with capacitive tip) is close to but not touching the i/o interface 110. The proximity detector may identify the location (x, y, z) of an object (e.g., finger) 160 in the three-dimensional hover-space 150, where x and y are in a plane parallel to the interface 110 and z is perpendicular to the interface 110. The proximity detector may also identify other attributes of the object 160 including, for example, how close the object is to the i/o interface (e.g., z distance), the speed with which the object 160 is moving in the hover-space 150, the pitch, roll, yaw of the object 160 with respect to the hover-space 150, the direction in which the object 160 is moving with respect to the hover-space 150 or device 100 (e.g., approaching, retreating), an angle at which the object 160 is interacting with the device 100, or other attributes of the object 160. While a single object 160 is illustrated, the proximity detector may detect and characterize more than one object in the hover-space 150.

In different examples, the proximity detector may use active or passive systems. For example, the proximity detector may use sensing technologies including, but not limited to, capacitive, electric field, inductive, Hall effect, Reed effect, Eddy current, magneto resistive, optical shadow, optical visual light, optical infrared (IR), optical color recognition, ultrasonic, acoustic emission, radar, heat, sonar, conductive, and resistive technologies. Active systems may include, among other systems, infrared or ultrasonic systems. Passive systems may include, among other systems, capacitive or optical shadow systems. In one embodiment, when the proximity detector uses capacitive technology, the detector may include a set of capacitive sensing nodes to detect a capacitance change in the hover-space 150. The capacitance change may be caused, for example, by a digit(s) (e.g., finger, thumb) or other object(s) (e.g., pen, capacitive stylus) that comes within the detection range of the capacitive sensing nodes. Different parts of a finger in a hover space may produce a set of different capacitive changes. For example, the distal phalange may produce a first change, an intermediate phalange may produce a second change, and a proximal phalange may produce a third change. In one embodiment, the intersection point may be determined based, at least in part, on a model of the finger that relies on acquiring data associated with the distal phalange.

In another embodiment, when the proximity detector uses infrared light, the proximity detector may transmit infrared light and detect reflections of that light from an object within the detection range (e.g., in the hover-space 150) of the infrared sensors. Similarly, when the proximity detector uses ultrasonic sound, the proximity detector may transmit a sound into the hover-space 150 and then measure the echoes of the sounds. In another embodiment, when the proximity detector uses a photo-detector, the proximity detector may track changes in light intensity. Increases in intensity may reveal the removal of an object from the hover-space 150 while decreases in intensity may reveal the entry of an object into the hover-space 150.

In general, a proximity detector includes a set of proximity sensors that generate a set of sensing fields in the hover-space 150 associated with the i/o interface 110. The proximity detector generates a signal when an object is detected in the hover-space 150. In one embodiment, a single sensing field may be employed. In other embodiments, two or more sensing fields may be employed. In one embodiment, a single technology may be used to detect or characterize the object 160 in the hover-space 150. In another embodiment, a combination of two or more technologies may be used to detect or characterize the object 160 in the hover-space 150.

In one embodiment, characterizing the object includes receiving a signal from a detection system (e.g., proximity detector) provided by the device. The detection system may be an active detection system (e.g., infrared, ultrasonic), a passive detection system (e.g., capacitive), or a combination of systems. The detection system may be incorporated into the device or provided by the device.

Characterizing the object may include determining that an object (e.g., digit, stylus) has entered the hover-space or has left the hover-space. Characterizing the object may also include identifying the presence of an object at a pre-determined location in the hover-space. The pre-determined location may be relative to the i/o interface or may be relative to the position of a particular user interface element or to user interface element 120. Characterizing the object may also include acquiring (x,y,z) data for two or more points on the object so that orientation and angle of interaction may be determined. The x,y,z data may report an x/y co-ordinate in a plane or volume oriented parallel to the input/output interface 110 and a z co-ordinate that measures a distance perpendicular to the face of the input/output interface 110.

Figure 2:
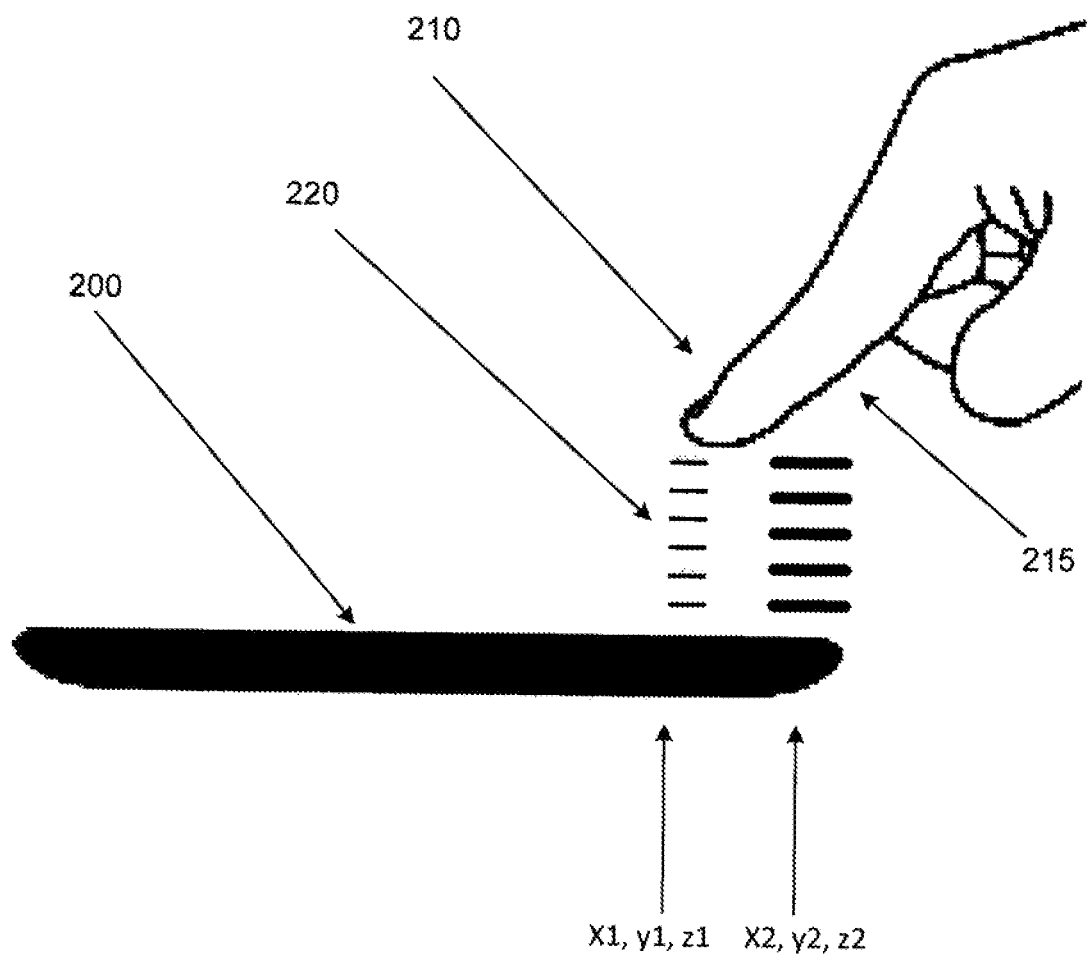
FIG. 2 illustrates an example z distance and z direction.

FIG. 2 illustrates an example z distance 220 and z direction associated with an example apparatus 200 that is configured to interact with a user based on orientation or angle information. The z distance may be perpendicular to apparatus 200 and may be determined by how far the tip 210 of the finger is located from apparatus 200. FIG. 2 also illustrates a second distance associated with region 215 of the finger. The tip 210 of the finger may be associated with a measurement (x1,y1,z1) and region 215 may be associated with a measurement (x2,y2,z2).

Figure 3:
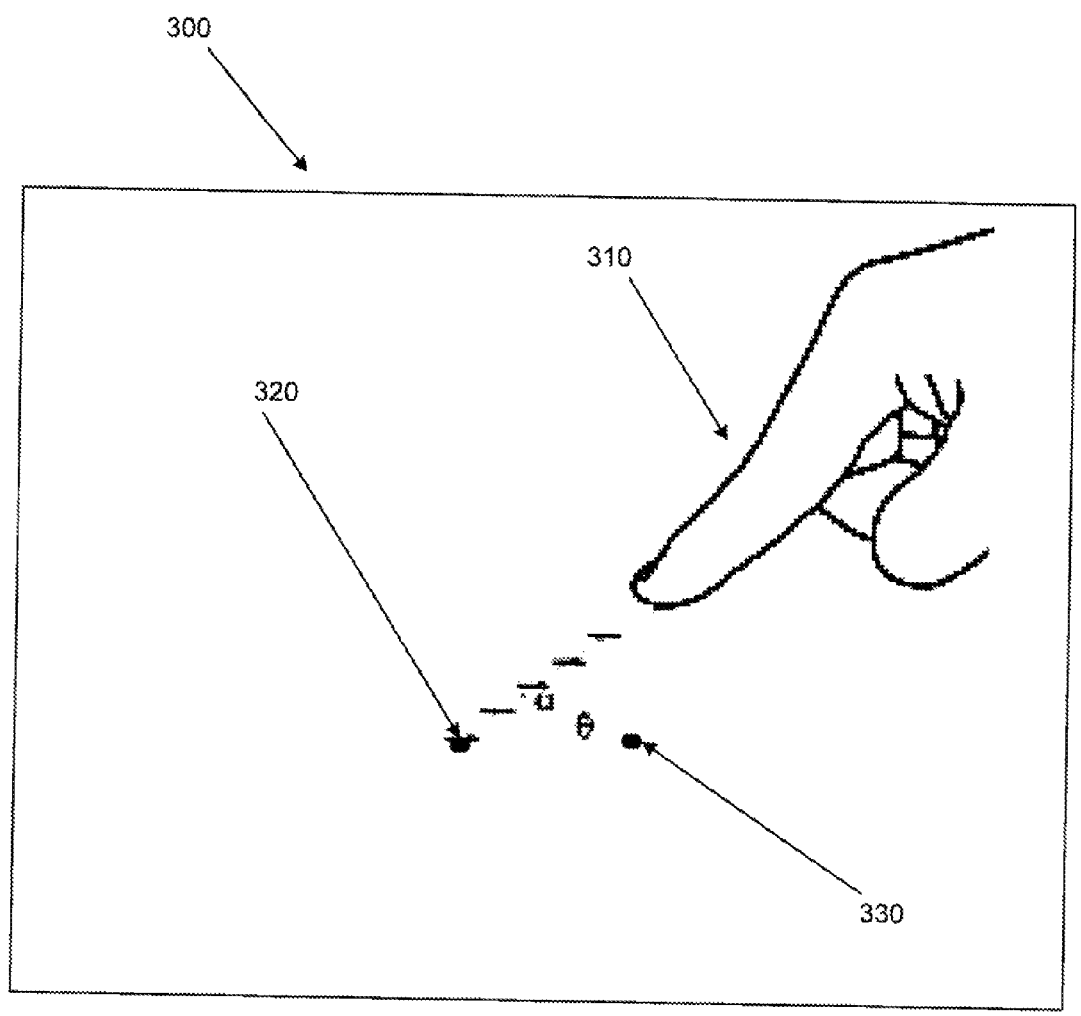
FIG. 3 illustrates an example hover point and intersection point.

FIG. 3 illustrates an example intersection point 320 and an example hover point 330. The hover point 330 may describe where the tip of the finger 310 is located. The intersection point 320 may describe where the finger 310 is pointed. Finger 310 may be located perpendicularly above device 300 at point 330. The point at which the projection of finger 310 would intersect with device 300 may be located at intersection point 320. In one embodiment, the locations of points 320 and 330 may be described by (x,y) co-ordinates. In another embodiment, the intersection point 330 may be described in relation to hover point 320. For example, a distance and angle in the x-y plane may be employed.

Figure 4:
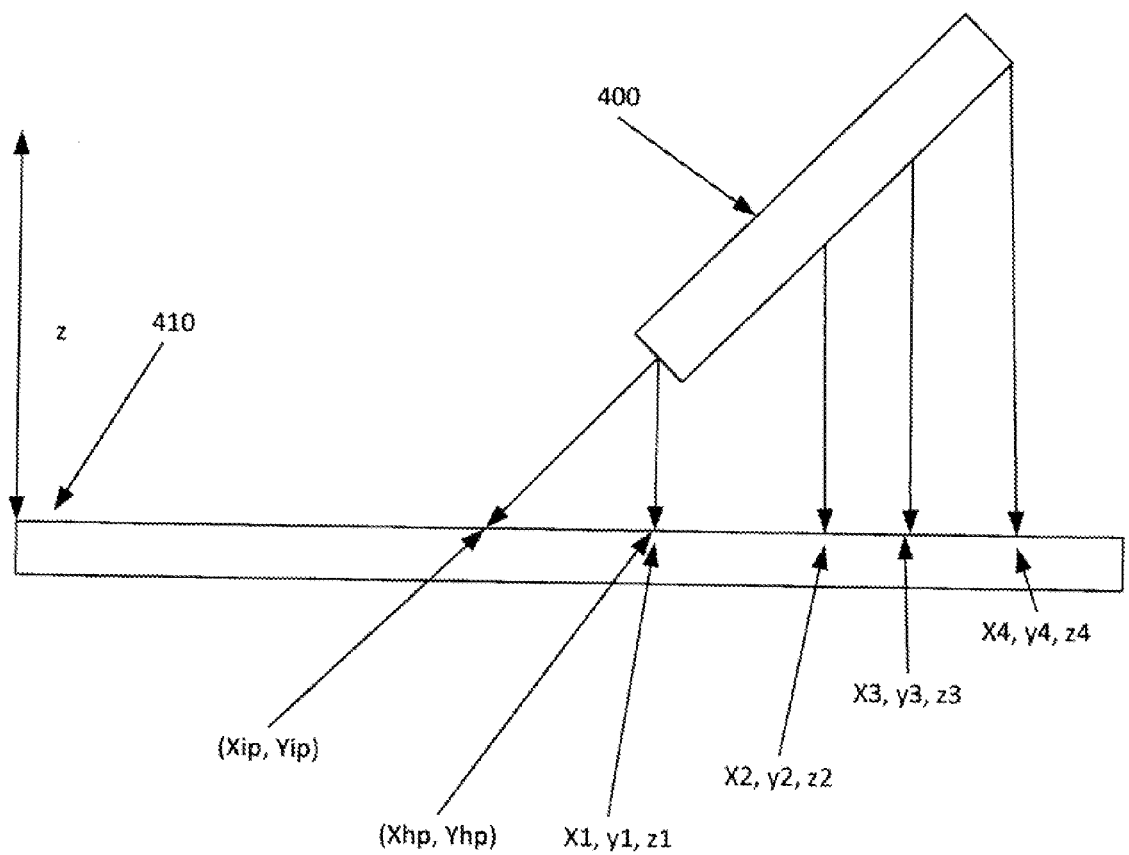
FIG. 4 illustrates example (x,y,z) measurement points associated with an example object in an example hover space.
Figure 4:
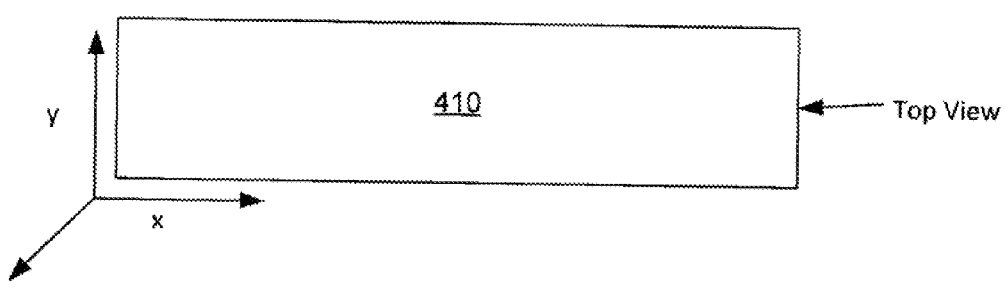

FIG. 4 illustrates a side view of an object 400 positioned above a hover-sensitive device 410. FIG. 4 also provides a top view of device 410 with an x,y,z, dimensions atlas. Sensors associated with hover-sensitive device 410 have acquired four separate (x,y,z) measurements for the object 400. The tip of object 400 closest to device 410 is represented by (x1,y1,z1). The end of object 400 farthest from device 410 is represented by (x4, y4, z4). Two points in between the tip and end of object 400 are represented by (x3, y3, z3) and (x2, y2, z2). A hover point has been identified on device 410 at location (Xhp, Yhp), which corresponds to (x1,y1). From the hover point and the measurements of object 400, an intersection point has been identified on device 410 at location (Xip, Yip). The intersection point could be identified in different ways including, for example, determining the formula for a line for object 400 and projecting that line from the object 400 down onto the device 410. Other methods may be employed.

Figure 5:
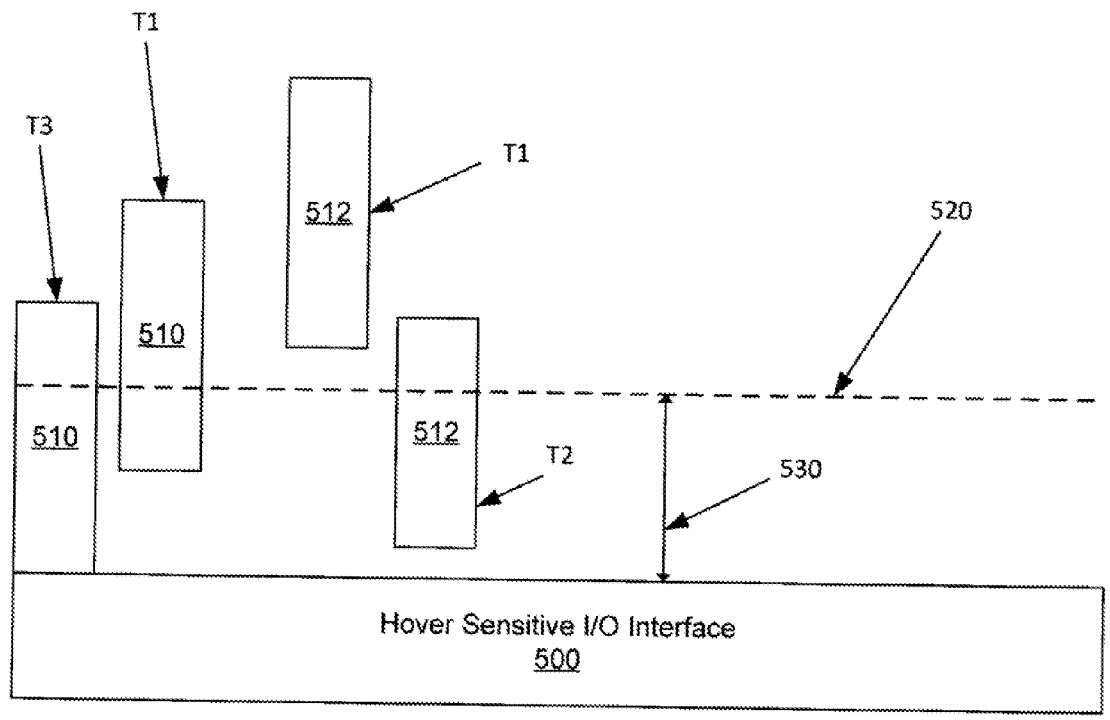
FIG. 5 illustrates an example hover sensitive input/output interface.

FIG. 5 illustrates a hover-sensitive i/o interface 500. Line 520 represents the outer limit of the hover-space associated with hover-sensitive i/o interface 500. The end of object 400 (FIG. 4) may have been determined by the intersection of object 400 with the outer limit of a hover-space associated with device 410 (FIG. 4). Line 520 is positioned at a distance 530 from i/o interface 500. Distance 530 and thus line 520 may have different dimensions and positions for different apparatus depending, for example, on the proximity detection technology used by a device that supports i/o interface 500.

Example apparatus and methods may identify objects located in the hover-space bounded by i/o interface 500 and line 520. Example apparatus and methods may also identify items that touch i/o interface 500. For example, at a first time T1, an object 510 may be detectable in the hover-space and an object 512 may not be detectable in the hover-space. At a second time T2, object 512 may have entered the hover-space and may actually come closer to the i/o interface 500 than object 510. At a third time T3, object 510 may come in contact with i/o interface 500. When an object enters or exits the hover space an event may be generated. When an object moves in the hover space an event may be generated. When an object touches the i/o interface 500 an event may be generated. When an object transitions from touching the i/o interface 500 to not touching the i/o interface 500 but remaining in the hover space an event may be generated. Example apparatus and methods may interact with events at this granular level (e.g., hover enter, hover exit, hover move, hover to touch transition, touch to hover transition) or may interact with events at a higher granularity (e.g., hover gesture). Generating an event may include, for example, making a function call, producing an interrupt, updating a value in a computer memory, updating a value in a register, sending a message to a service, sending a signal, or other action that identifies that an action has occurred. Generating an event may also include providing descriptive data about the event. For example, a location where the event occurred, a title of the event, and an object involved in the object may be identified.

In computing, an event is an action or occurrence detected by a program that may be handled by the program. Typically, events are handled synchronously with the program flow. When handled synchronously, the program may have a dedicated place where events are handled. Events may be handled in, for example, an event loop. Typical sources of events include users pressing keys, touching an interface, performing a gesture, or taking another user interface action. Another source of events is a hardware device such as a timer. A program may trigger its own custom set of events. A computer program that changes its behavior in response to events is said to be event-driven.

Figure 6:
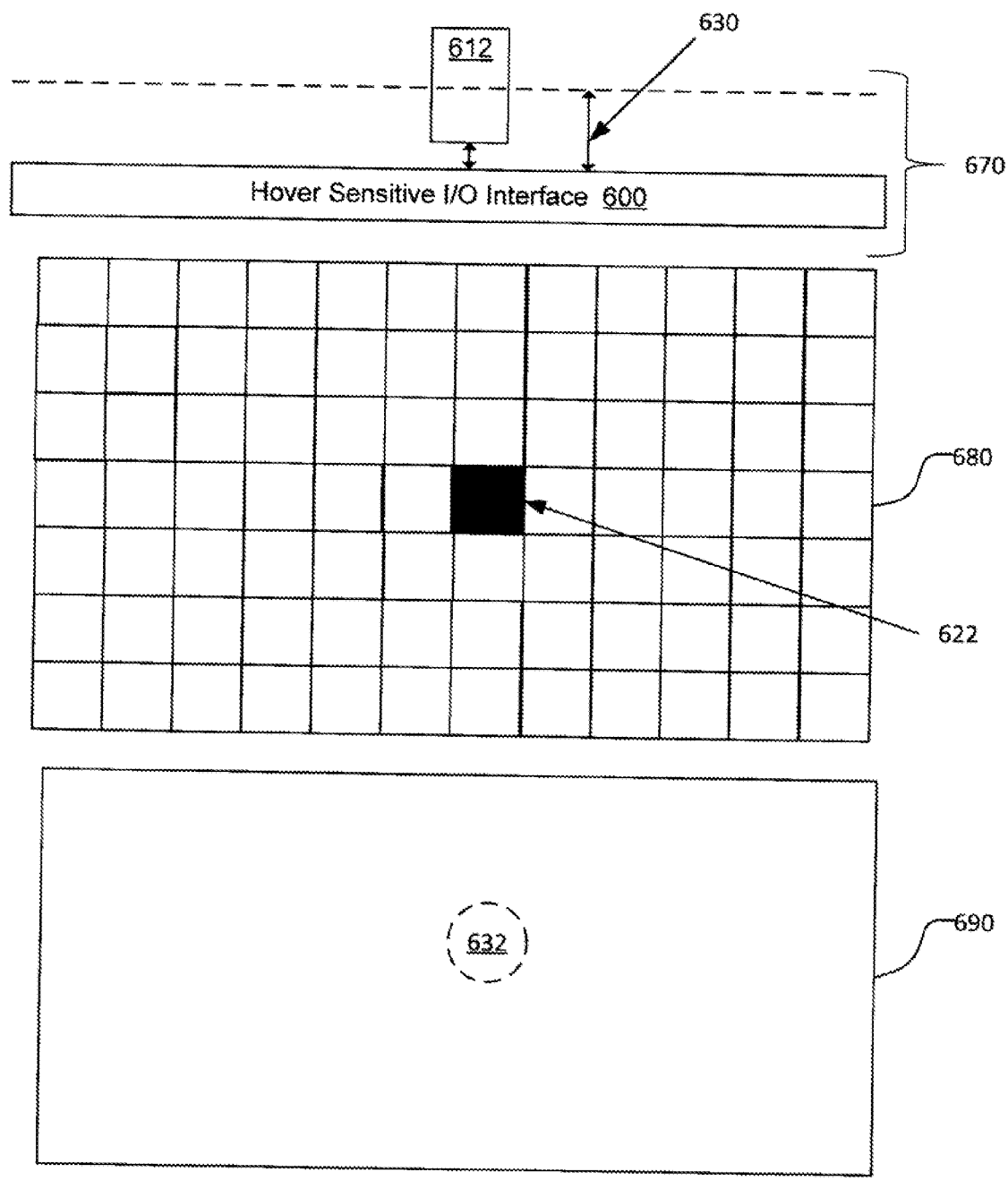
FIG. 6 illustrates an example hover sensitive input/output interface.

FIG. 6 illustrates an object 612 positioned partially in a hover space above hover-sensitive i/o interface 600. Region 670 provides a side view of object 612. The hover space is bounded by a distance 630 above interface 600. Region 680 illustrates a top view of representations of regions of the i/o sensitive interface 600 that are affected by object 612. The solid shading of portion 622 in region 680 indicates that a hover point for object 612 is associated with the solid area 622. Region 690 illustrates a top view representation of a display that may appear on a graphical user interface associated with hover-sensitive i/o interface 600. Dashed circle 632 represents a hover point graphic that may be displayed in response to the presence of object 612 in the hover space. While a single hover point has been detected, interface 600 may detect more than one object. In one embodiment, the dashed circle may be displayed while in another embodiment the dashed circle may not be displayed. Since object 612 is positioned perpendicular to interface 600, there is only a single point detected for the object 612 and the angle of interaction is ninety degrees.

Figure 7:
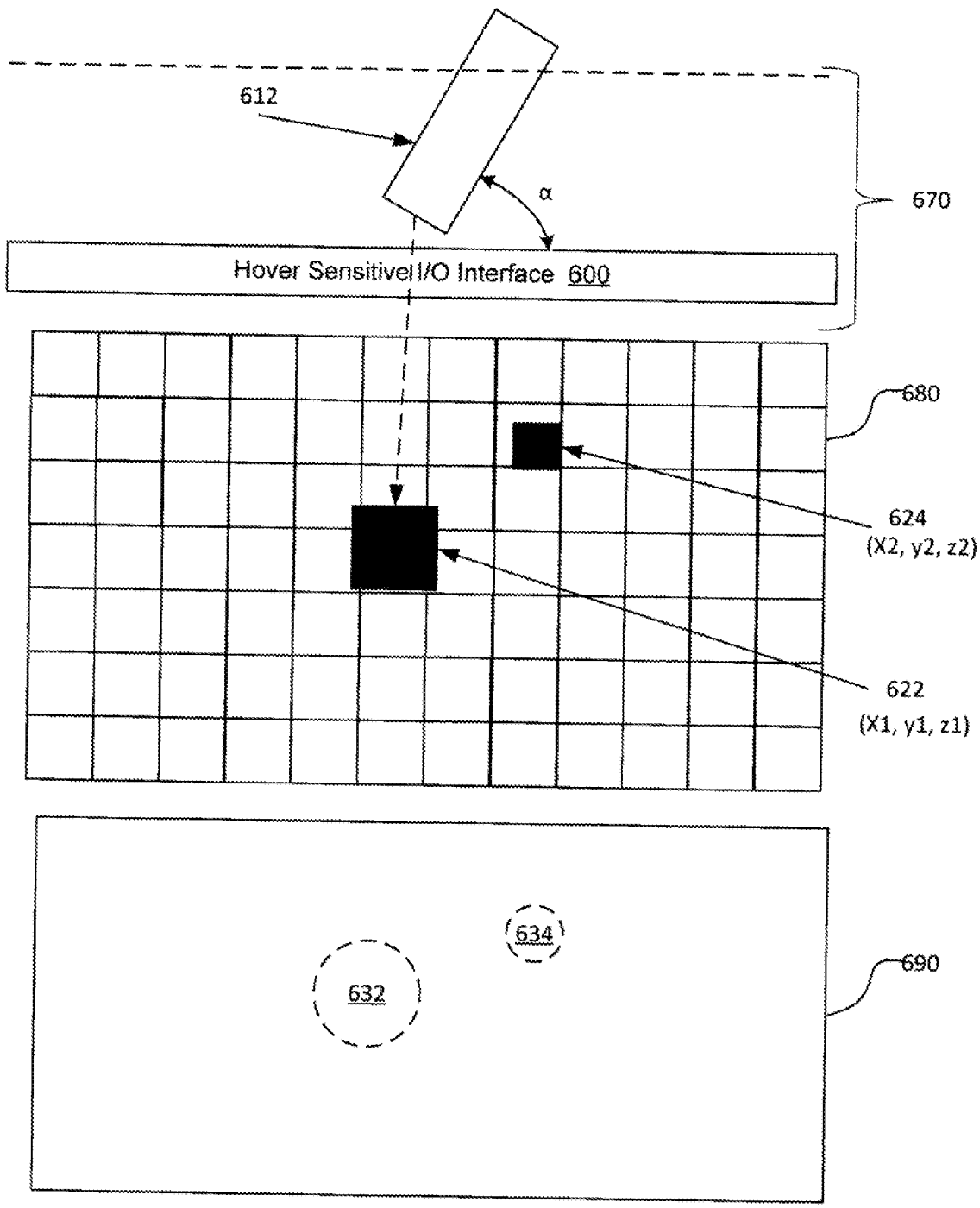
FIG. 7 illustrates an example hover sensitive input/output interface configured to detect and respond to a hover angle.

FIG. 7 illustrates object 612 approaching interface 600 at an angle α that is not perpendicular to interface 600. Thus, sensors associated with interface 600 have identified two points associated with object 612. A first point may be represented by (x1, y1, z1) and a second point may be represented by (x2, y2, z2). The first point is closer to interface 600 than the second point and thus z1<z2. In one embodiment, the closest point may be used to identify a hover point and the second point may be used to identify an end point. Since the first point is closer to interface 600 a dashed circle 632 associated with the first point and a shaded region 622 associated with the first point may be displayed larger than a circle 634 and region 624 associated with the end point.

In one embodiment, the regions 622 and 624 or circles 632 and 634 associated with the hover point and end point may be connected or otherwise collectively analyzed to determine the orientation of object 612 in the x/y plane. The angle α may be identified as the angle at which object 612 is approaching interface 600. The angle and orientation may be used to project an intersection point on interface 600.

Figure 8:
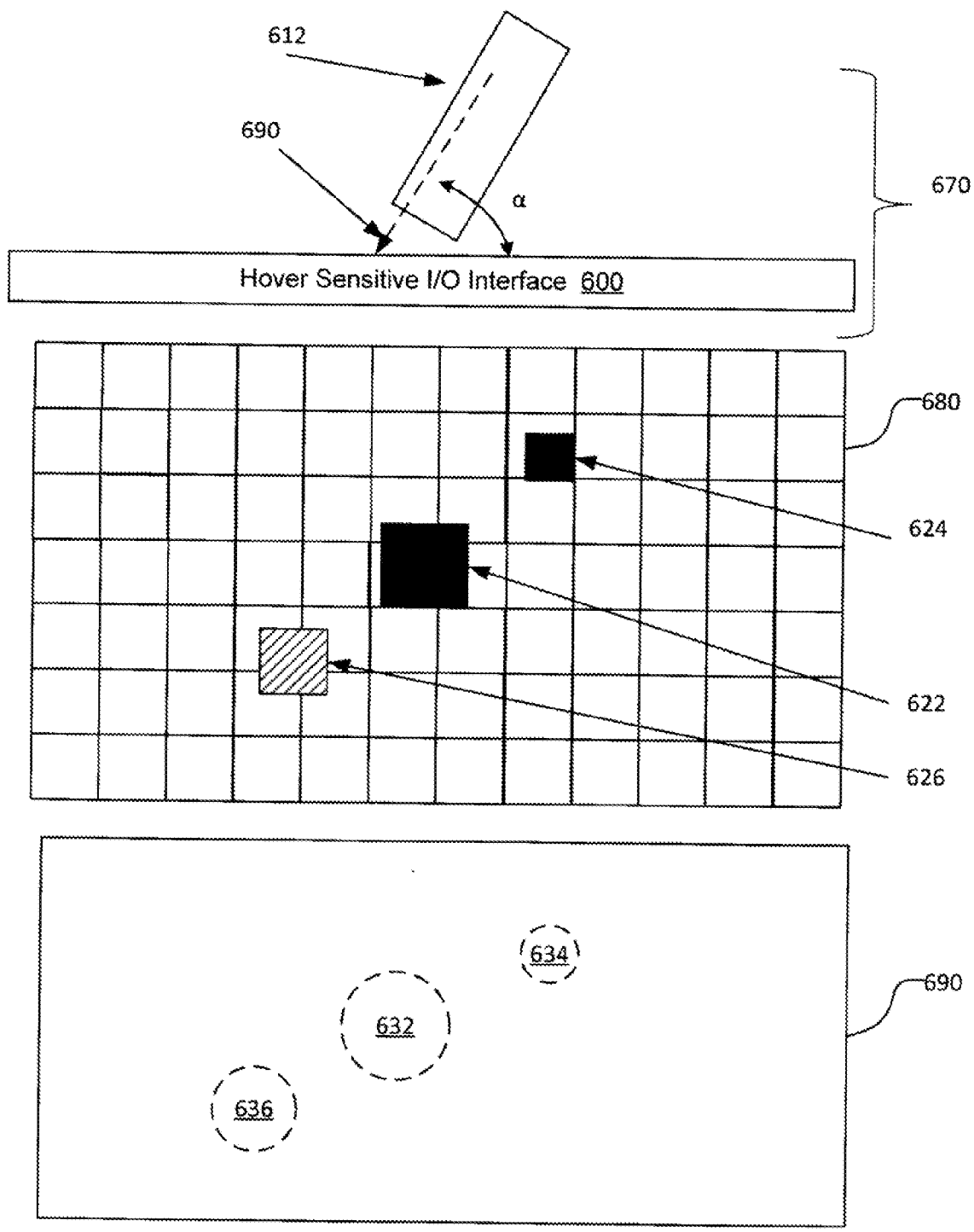
FIG. 8 illustrates an example hover sensitive input/output interface configured to detect and respond to a hover angle.

FIG. 8 illustrates an intersection point that has been determined for object 612. The intersection point may be represented by hatched area 626 and dashed circle 636. The intersection point may appear on interface 600 at the point where line 690 would intersect interface 600. Line 690 may be computed as a function of the two points associated with object 612 (e.g., (x1,y1,z1), (x2,y2,z2)) or by one of the points and the angle α.

Figure 9:
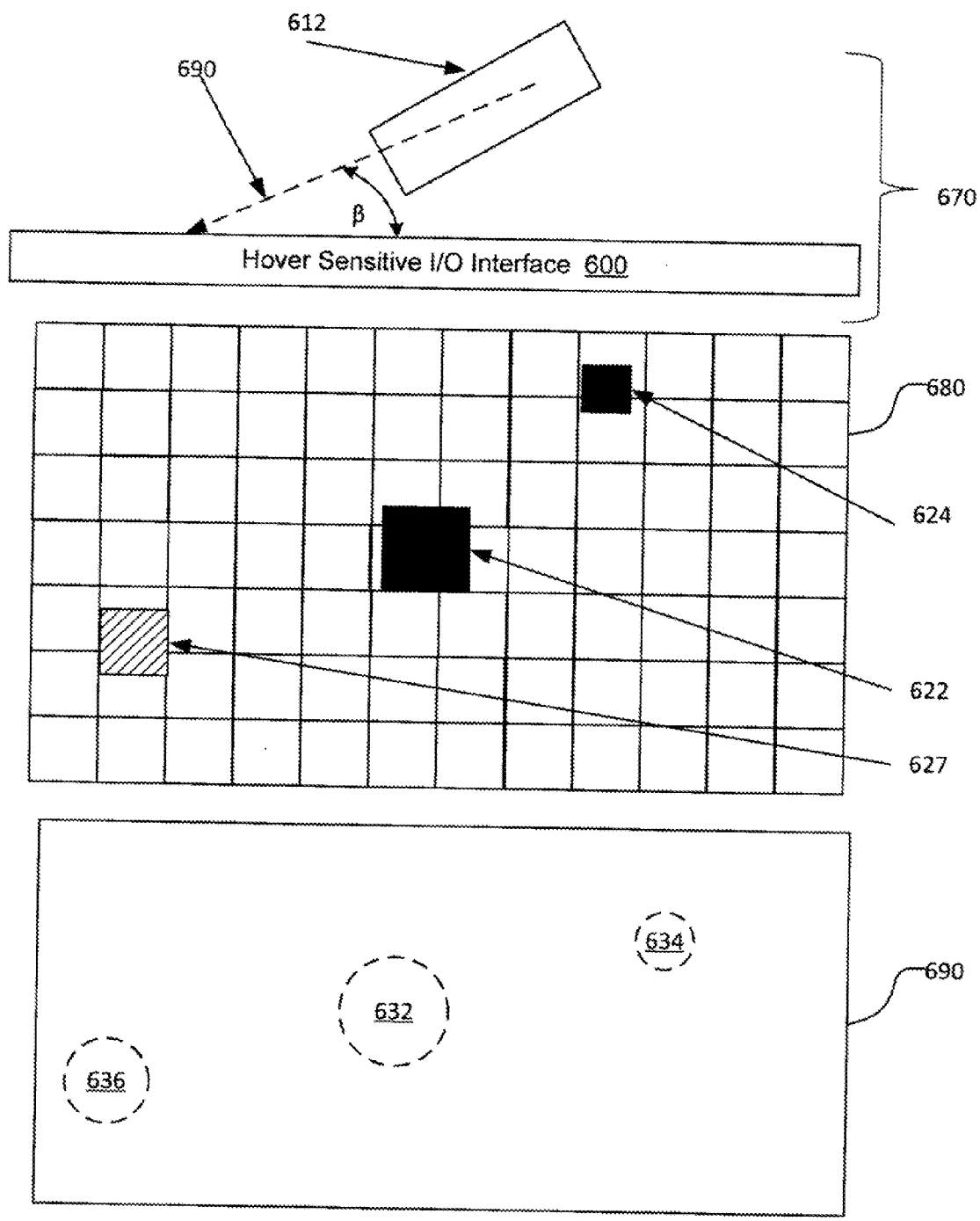
FIG. 9 illustrates an example hover sensitive input/output interface configured to detect and respond to a hover angle.

FIG. 9 illustrates an intersection point determined by object 612 when it is pitched at a more acute angle β. Hatched area 627 is located farther to the left on interface 600 as the line 690 has intersected interface 600 farther to the left.

Figure 10:
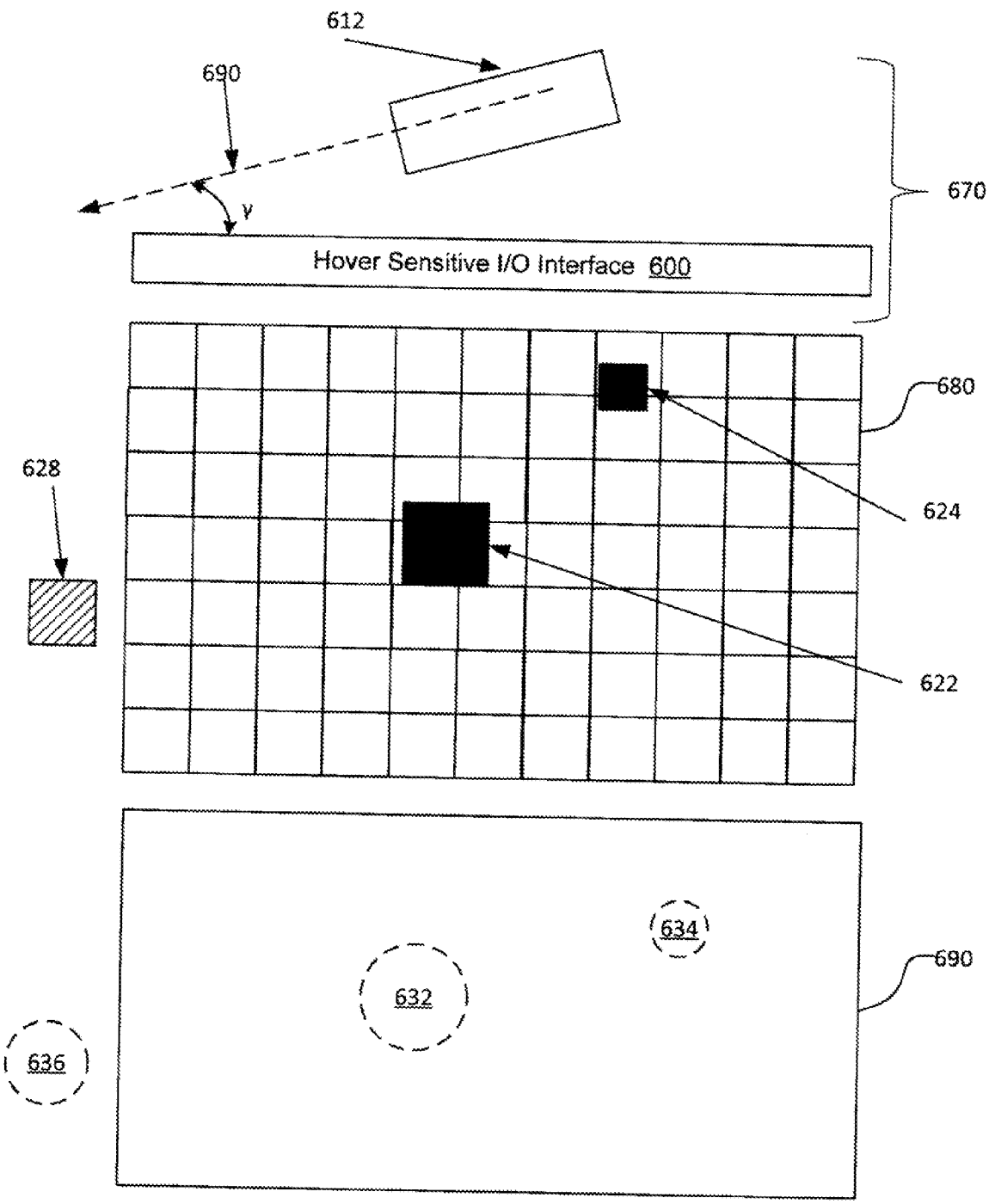
FIG. 10 illustrates an example hover sensitive input/output interface configured to detect and respond to a hover angle.

FIG. 10 illustrates an intersection point that is not even located on interface 600 when object 612 is pitched at a very acute angle γ. In this example, line 690 does not intersect interface 600 and hatched region 628 would not appear in region 680 or on display 690. Although the intersection point is not located on the interface 600, the intersection point may still be used to control the interface 600. For example, a map displayed on interface 600 could be controlled to scroll towards the intersection point. In another example, an object in a game could be controlled to move in the direction indicated by the intersection point.

Figure 11:
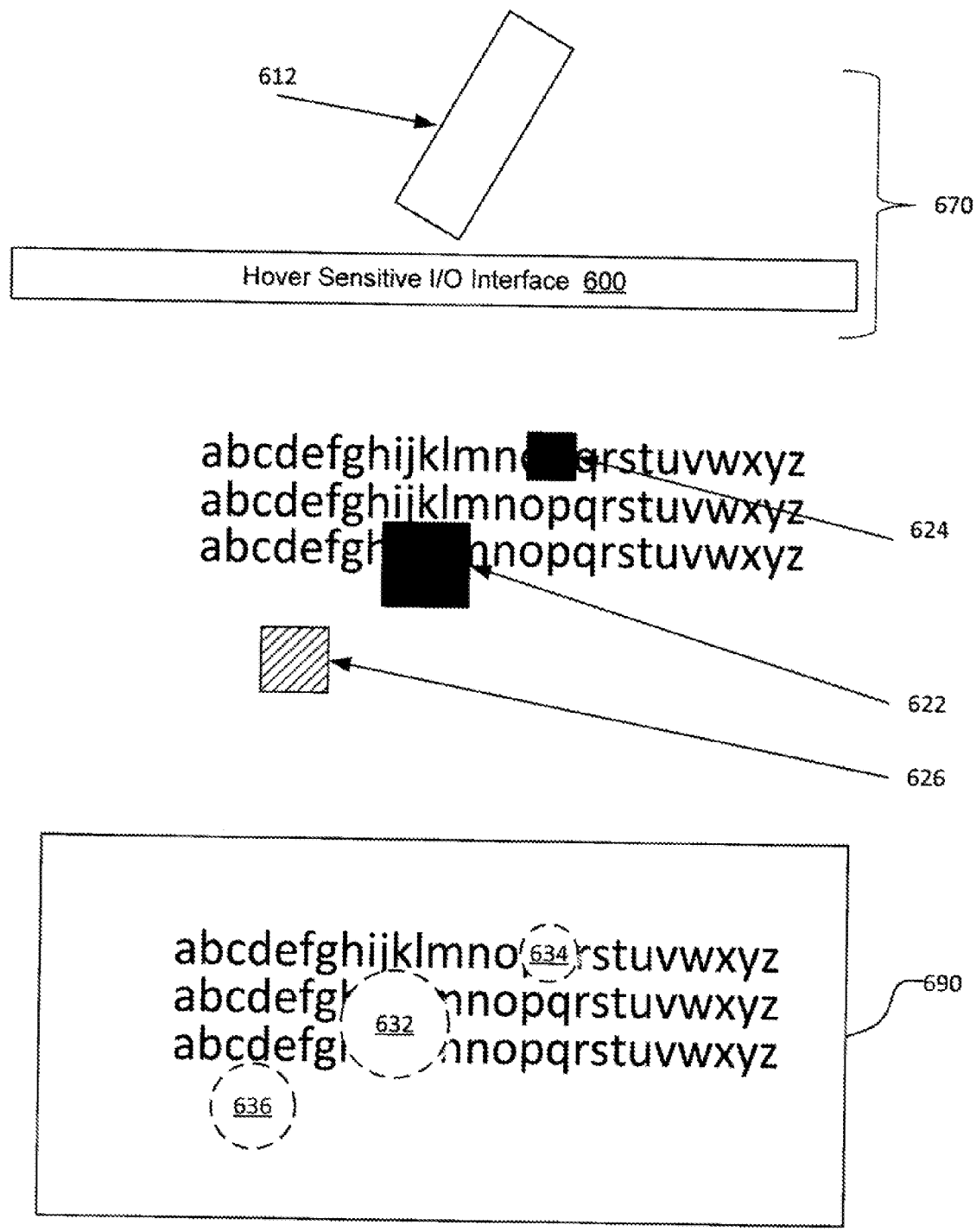
FIG. 11 illustrates an example hover sensitive input/output interface configured to detect and respond to a hover angle.
Figure 12:
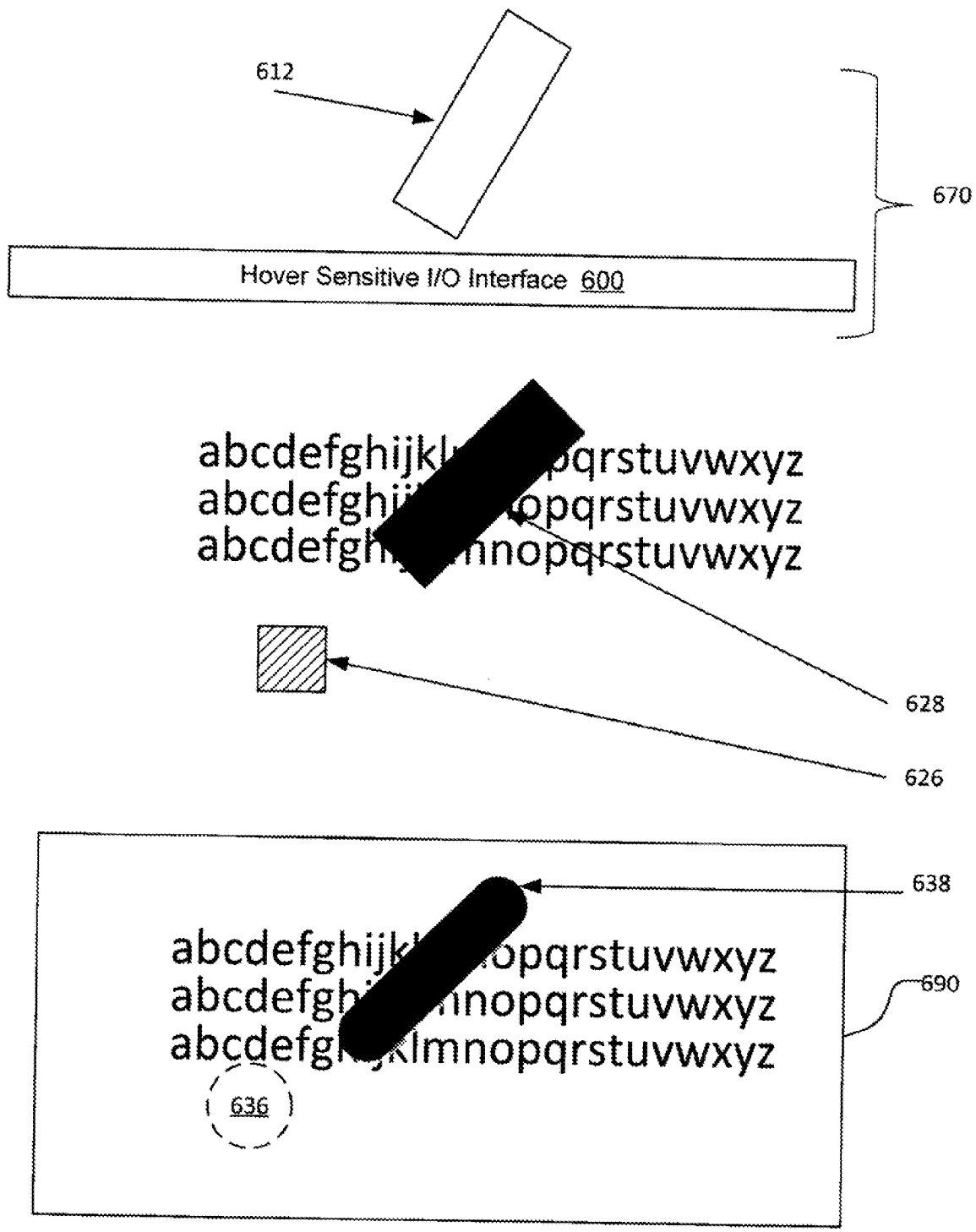
FIG. 12 illustrates an example hover sensitive input/output interface configured to detect and respond to a hover angle.

FIG. 11 illustrates text that has been occluded by regions 622 and 624 or by circles 632 and 634. An object disposed between a user's point of view and the device being viewed may occlude images (e.g., text) presented on the device being viewed. Thus the actual occlusion that would be produced if object 612 was in between the user's eyes and the i/o interface 600 is illustrated in FIG. 12. This is a classic problem with handheld devices that a user interacts with using touch or hover. When a finger or stylus or apparatus is used to touch or hover above the device, a portion of the device cannot be seen by the user.

Figure 13:
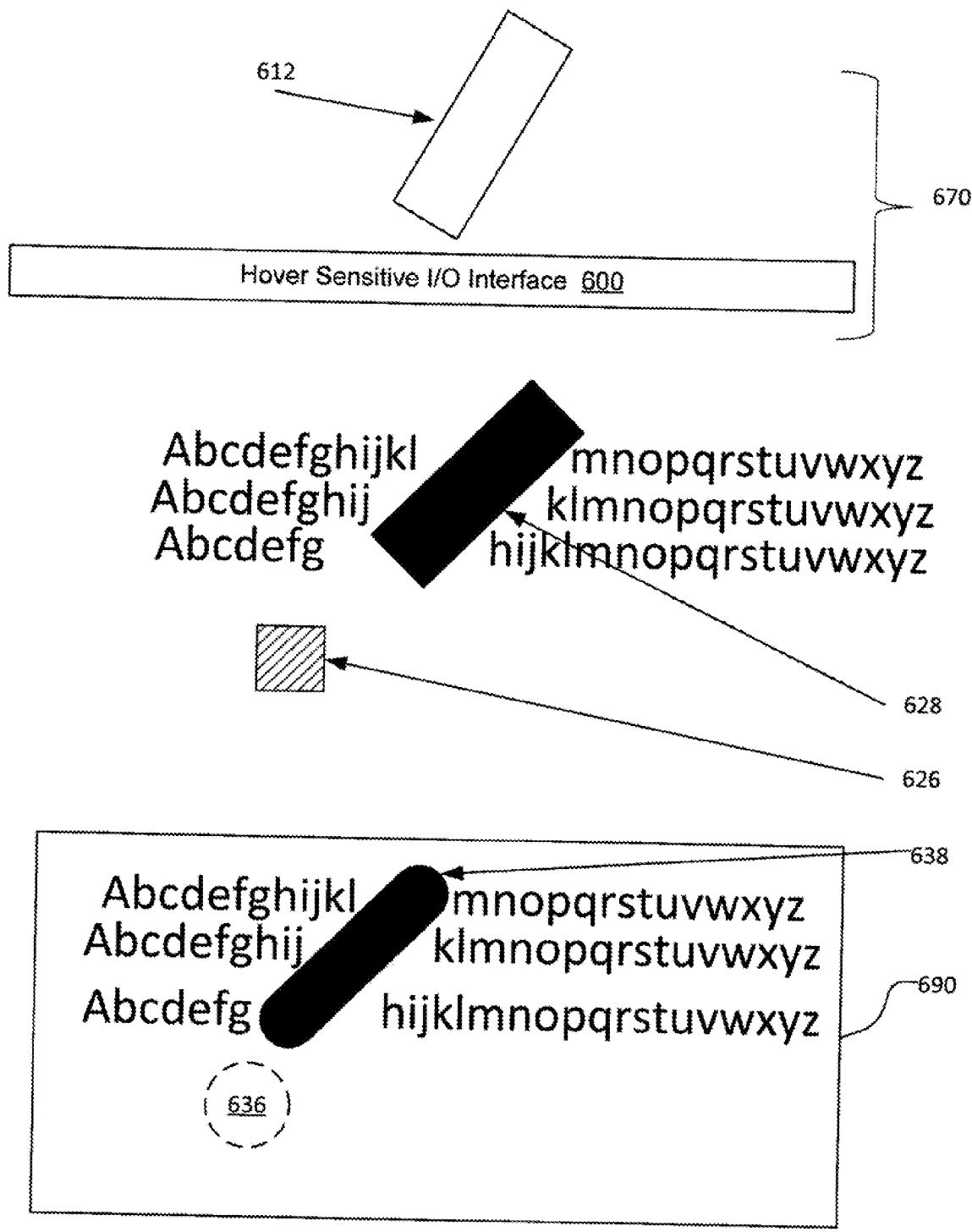
FIG. 13 illustrates an example hover sensitive input/output interface configured to detect and respond to a hover angle.

FIG. 13 illustrates one way in which example apparatus and methods may deal with the occlusion issue. By detecting the orientation of object 612 and by detecting the angle with which object 612 is approaching the interface 600, decisions can be made concerning what portion of the interface 600 may not be visible to a user. The decision may also depend on the orientation of the device incorporating interface 600. With the orientation and angle determined, the intersection point can be identified. Hatched region 626 and circle 636 represent the intersection point. Based on the location, position, and angle of object 612 and based on the intersection point, example apparatus and methods may relocate text as illustrated in FIG. 13. More generally, example apparatus and methods may account for items that may be occluded by object 612. For example, items may be moved to locations where the items are visible, items may be de-activated to prevent inadvertent user interactions, items may be re-sized to become visible around the object, or other actions may be taken.

Figure 14:
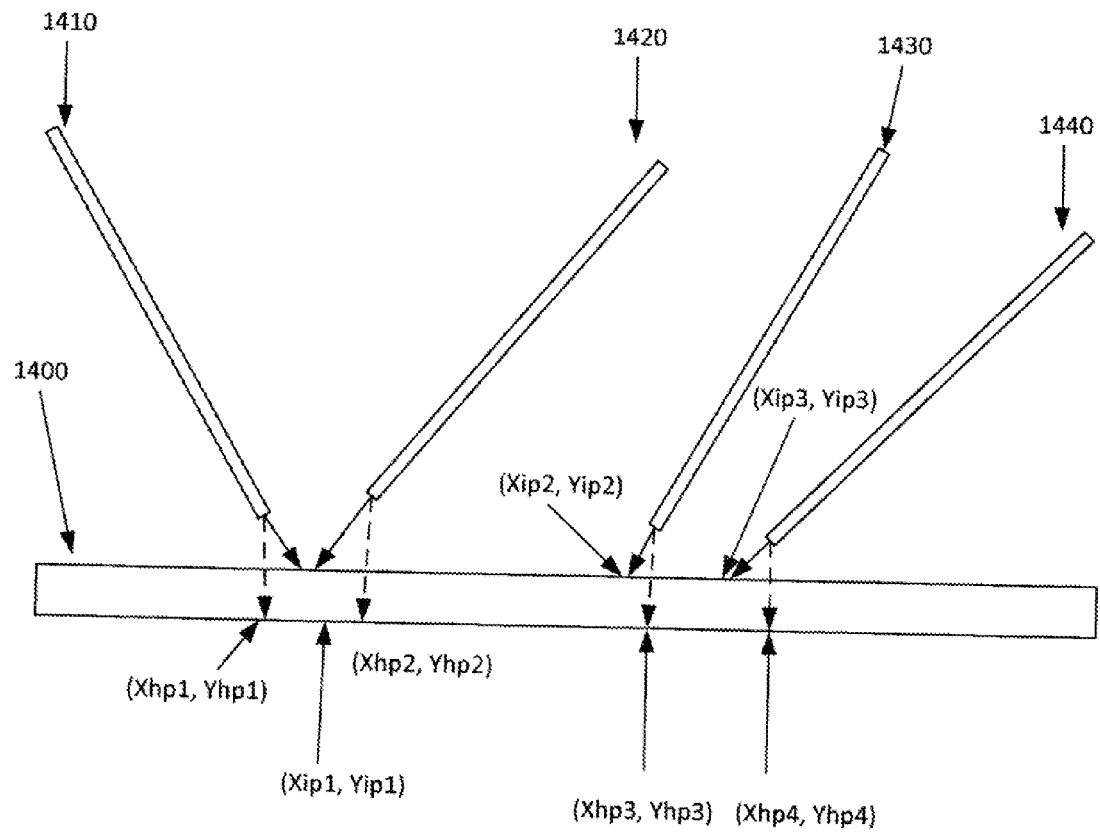
FIG. 14 illustrates detecting and responding to two hover angles.

FIG. 14 illustrates four objects located in a hover space associated with a hover-sensitive input/output interface 1400. Objects 1410 and 1420 produce two hover points at (xhp1, yhp1) and (xhp2, yhp2) but only yield a single intersection point at (xip1, yip1). A single intersection point is produced because the angles at which objects 1410 and 1420 are approaching interface 1400 cause the virtual extensions of 1410 and 1420 to be located within a tolerance distance of each other on the interface 1400. An object located at the single intersection point may be manipulated based, at least in part, on being the object of the single intersection point produced by two or more objects in the over space. For example, a "chop sticks" game may have a user pretend to pick up Chinese food from the interface 1400 using virtual chop sticks. In another example, the single intersection point may be used to perform a combined "mouse-over" followed by click effect. Object 1410 may produce the intersection point which may cause a mouse-over effect for a user interface element located at the intersection point. After evaluating the information produced by the mouse over effect, a virtual "click", or more generally a "proceed" event may be generated by causing the second intersection point to be co-located within a tolerance of the first intersection point.

Objects 1430 and 1440 produce two hover points at (xhp3, yhp3) and (xhp4, yhp4) and also produce two separate intersection points at (xip2, yip2) and (xip3, yip3). The two intersection points may be used, for example, to manipulate objects displayed on interface 1400. For example, the intersection point produced by object 1430 may "grab" one end of an item and the intersection point produced by object 1440 may "grab" another end of the item. The intersection points may then be used to re-orient the object that was grabbed. In another example, the two intersection points may mark the beginning and ending of a section of text to be cut from a document. In another embodiment, a first intersection point may be used to mark the origin of an effect (e.g., flamethrower in a game) and the second intersection point may be used to mark the direction and extent of the effect.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 15:
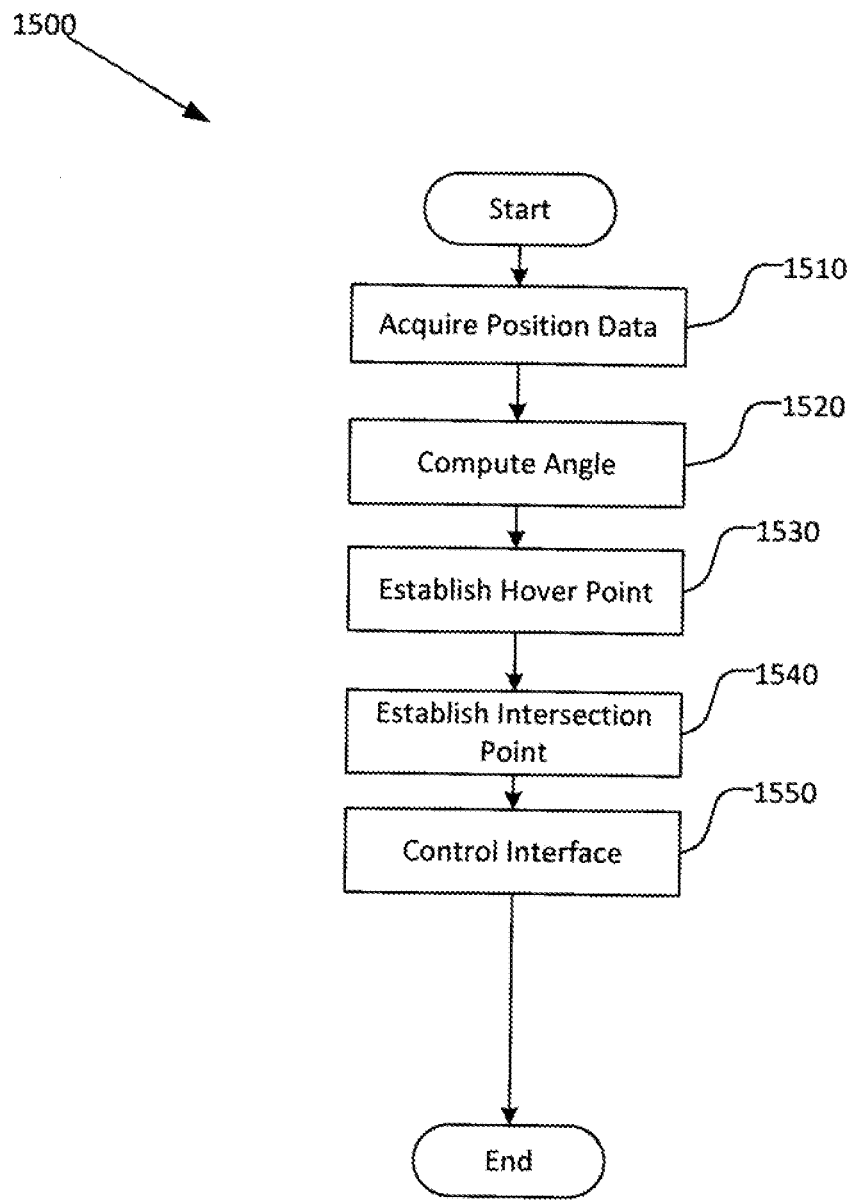
FIG. 15 illustrates an example method associated with detecting and responding to a hover angle.

FIG. 15 illustrates an example method 1500 associated with detecting an angle at which an object is pitched with respect to an interface on a portable computing device (e.g., smart phone, tablet). In one embodiment, the object is a finger and the angle is computed based on position data for a distal phalange on the finger. Position information for the intermediate phalange or proximal phalange may need to be identified and ignored. In one embodiment, the pitch is associated with the angle at which the object would intersect with the interface if the object touched the interface while maintaining its orientation.

Method 1500 may include, at 1510, acquiring position data about a portion of an object located at least partially in a three-dimensional hover space produced by a portable apparatus having a hover-sensitive interface. The portable apparatus may be, for example, a phone, a smart phone, a tablet computer, a camera, or other device. In one embodiment, the position data is acquired from a sensor located in the apparatus or from a sensor located on the apparatus. The sensor may be, for example, a proximity detector. The position data describes the position of the object in the three dimensional hover space. The three dimensions include a first dimension and a second dimension in the hover space that define a plane that is parallel to the surface of the interface. The second dimension is orthogonal to the first dimension. The first dimension may be referred to as the x-direction and the second dimension may be referred to as the y-direction. The three dimensions also include a third dimension in the hover space that is orthogonal to both the first dimension and the second dimension and perpendicular to the plane defined by the first and second dimension. The third dimension may be described as the z-direction.

Method 1500 may also include, at 1520, computing an angle at which the object is pitched with respect to the interface based, at least in part, on the position data. In one embodiment, the angle is computed based on position data associated with two different portions of the object. For example, the difference in height of two parts of the object may be recorded by the different measurements in the third dimension. The different heights may be used to determine how the object is oriented (e.g., pitched) towards the interface. Pitch, as used herein, refers to its usage in roll, pitch, yaw descriptions. Imagine an airplane flying over the interface. If the airplane is flying toward the interface with its nose down then it is pitched down towards the interface and the pitch angle would be an acute angle. If the airplane is flying away from the interface with its nose up then it is pitched up away from the interface and the pitch angle would be an obtuse angle. If the plane was flying directly at the interface with its nose down the angle would be ninety degrees. If the plane was flying perfectly parallel to the interface the plane would be pitched neither towards nor away from the interface and there would be no angle or the angle would be considered to be zero.

Method 1500 may also include, at 1530, establishing a hover point for the object. The hover point may be determined from information in the position data about the location of a portion of the object in the first dimension and the location of the object in the second dimension, in other words, the hover point may be placed based on x,y co-ordinates in the plane. In one embodiment, the hover point may be positioned under the portion of the object that is closest to the interface.

Method 1500 may also include, at 1540, establishing an intersection point for the object. The intersection point may be determined from information in the position data about the location of the object in the first dimension, the location of the object in the second dimension, the location of the object in the third dimension, and on the angle. In other words, the intersection point may be placed at a position offset from the x,y position of the hover point based on the angle and height of the object. In one embodiment, the intersection point may be computed by determining where a line projected from the object would intersect the plane defined by the surface of the interface.

Method 1500 may also include, at 1550, controlling the interface based, at least in part, on the angle at which the object is pitched with respect to the apparatus. The control that is exercised may include changing how the interface operates, changing how the interface looks, or changing the look or operation of elements on the interface. In one embodiment, if an object is pointed directly at the interface, control may be exercised on a particular element. If an object is pitched at an acute angle within a threshold range, then a portion of the interface may be controlled. If an object is pitched at an acute angle outside the threshold range then the entire interface may be controlled. If the object is parallel to the interface, then the device may be controlled instead of the interface.

Example methods may acquire information, compute angles, establish hover points, and establish intersection points for more than a single object in the hover space. Therefore, in one embodiment, method 1500 may also include acquiring second position data about a second object located in the three-dimensional hover space. Once the second position data is acquired, method 1500 may include computing a second angle at which the second object is pitched with respect to the interface based, at least in part, on the second position data. Then, the control exercised at 1550 may also depend on a relationship between the angle at which the first object is pitched with respect to the interface and the second angle.

The intersection point may be used in different ways by different applications. For example, one embodiment of method 1500 may include fixing the intersection point at a first (x,y) location on the interface. Then, second position data about the object may be acquired and a second angle at which the object is pitched with respect to the interface may be computed. This second position data and second angle may be used to establish a second intersection point for the object. Then the control exercised at 1550 may also depend on a relationship between the intersection point and the second intersection point.

Figure 16:
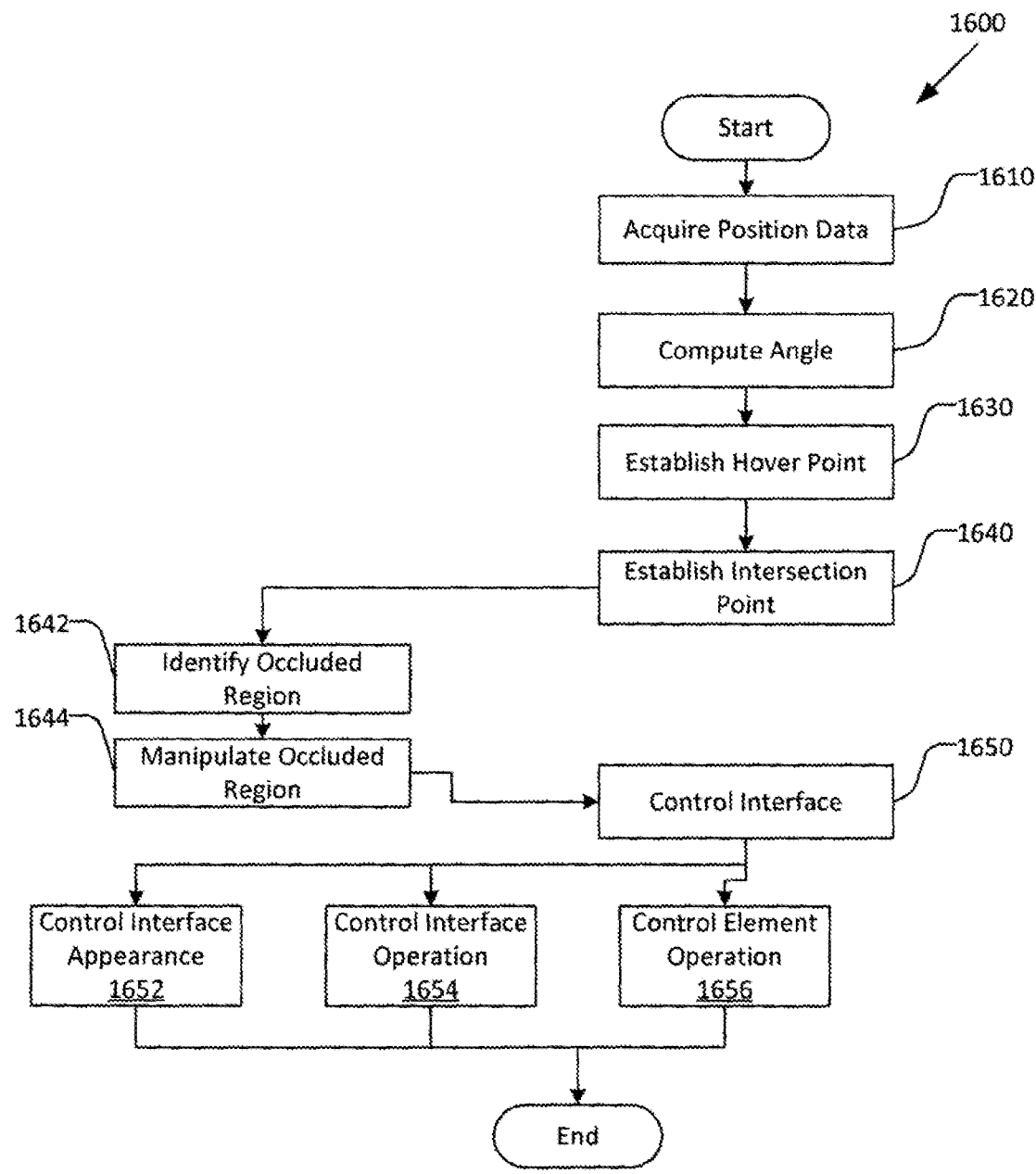
FIG. 16 illustrates an example method associated with detecting and responding to a hover angle.

FIG. 16 illustrates an example method 1600 that is similar to method 1500 (FIG. 15). For example, method 1600 includes acquiring position data at 1610, computing an angle at 1620, establishing a hover point at 1630, establishing an intersection point at 1640, and controlling the interface at 1650. However, method 1600 also includes additional actions.

In one embodiment, method 1600 may include, at 1642, identifying a portion of the interface that is occluded by the object based, at least in part, on the position data and the angle. For example, based on a determination about the user's point of view and the position of the object, it may be determined that a certain portion of the interface may be occluded because the object is disposed between the point of view and the interface.

Once a determination has been made that a portion of the interface may be occluded, then method 1600 may include, at 1644, selectively manipulating the portion of the interface that is occluded by the object. Manipulating the portion of the interface that is occluded may include moving that portion to another region where the portion can be viewed, desensitizing the portion to prevent inadvertent actions, or other operations.

The control that is exercised at 1650 may take various forms. For example, based on the hover point, the intersection point, or the angle, different actions may be taken. Therefore, method 1600 may include, at 1652, selectively controlling the appearance of the interface. In one embodiment, controlling the appearance of the interface at 1652 includes re-orienting a display on the interface. For example, the interface may be rotated towards the intersection point. Controlling the appearance of the interface may also include dynamically reconfiguring a user interface element. Reconfiguring the user interface element may include changing an appearance of the user interface element (e.g., making the element brighter, making the element dimmer), changing a position of the user interface element (e.g., moving towards intersection point, moving away from intersection point) changing an orientation of the user interface element (re-orienting to be parallel to object, re-orienting to be normal to object), changing a size of the user interface element (making larger, making smaller), or simulating a mouse-over event for the user interface element.

Method 1600 may also include, at 1654, selectively controlling the operation of the interface, in one embodiment, controlling the operation of the interface may include enhancing a functionality of a first item located in an area within a threshold distance of the intersection point or diminishing the functionality of a second item located beyond a threshold distance from the intersection point. For example, a user interface element that is within a quarter of an inch of the intersection point may have a hit-target region increased. Conversely, a user interface element that is more than an inch from the intersection point may have a hit-target region disabled so that an inadvertent "click" cannot be performed. Controlling the operation of the interface may also include, for example, disabling all interactions when the intersection point is located off the interface. Controlling the operation of the interface may also include, for example, selecting an operating mode based on the position of the intersection point. For example, if the intersection point is in a first region (e.g., top) of the interface, then the device may function as a productivity application device while if the intersection point is in a second region (e.g., bottom) of the interface, the device may function as a communication device.

Method 1600 may also include, at 1656, selectively controlling the operation of a user interface element. Controlling the operation of the user interface element may include, for example, controlling a direction of a graphical effect associated with the user interface element, controlling an intensity of a graphical effect associated with the user interface element, or controlling an area impacted by a graphical effect associated with the user interface element. Consider a video game that includes a water hose. The hose may be aimed using a pointing finger. The direction in which the water is supposed to fly may be controlled by the x,y orientation of the finger while the range to which the water is supposed to fly may be controlled by the angle of the finger. Additionally, the intensity of the water may be controlled by the distance of the finger from the interface.

While FIGS. 15 and 16 illustrate various actions occurring in serial, it is to be appreciated that various actions illustrated in FIGS. 15 and 16 could occur substantially in parallel. By way of illustration, a first process could acquire position information, a second process could compute angles, hover points, or intersection points, and a third process could exercise control. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 1500 or 1600. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 17:
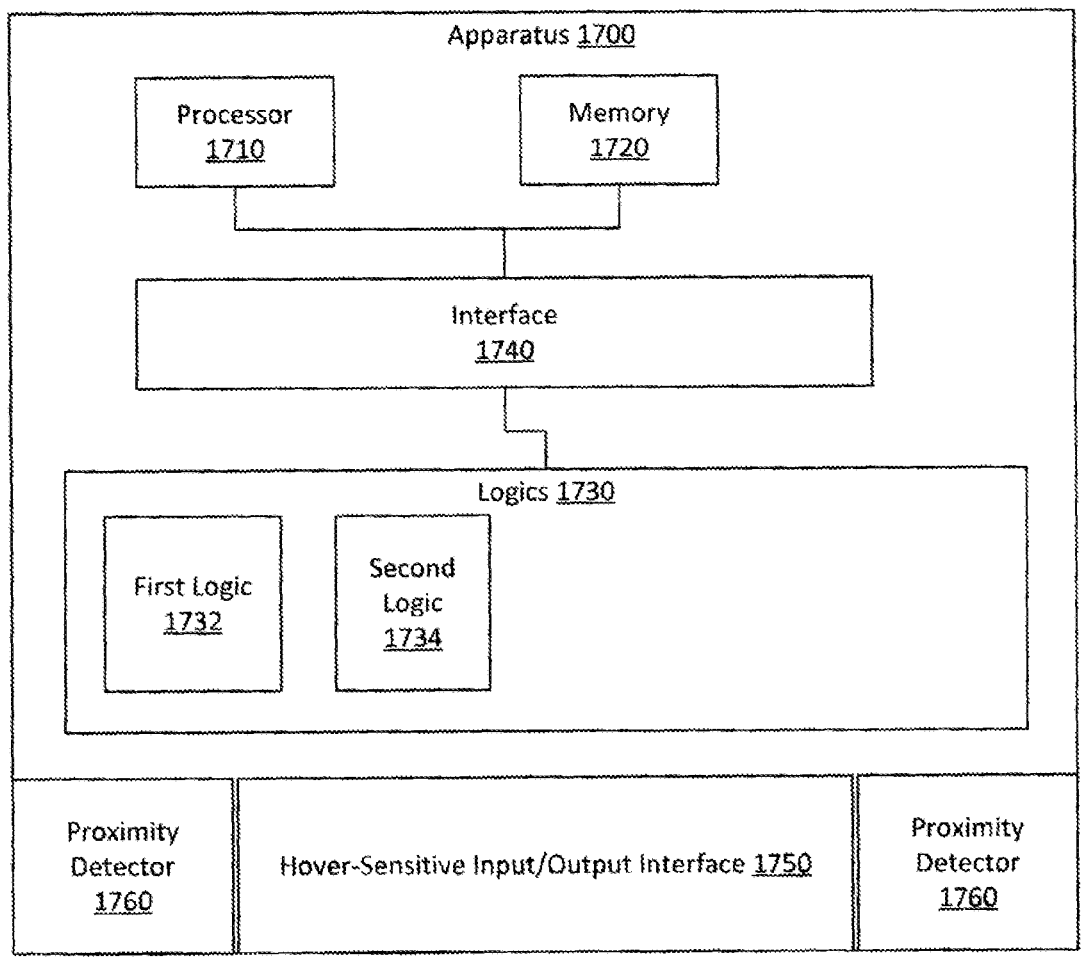
FIG. 17 illustrates an example apparatus configured to detect and respond to a hover angle.
Figure 17:
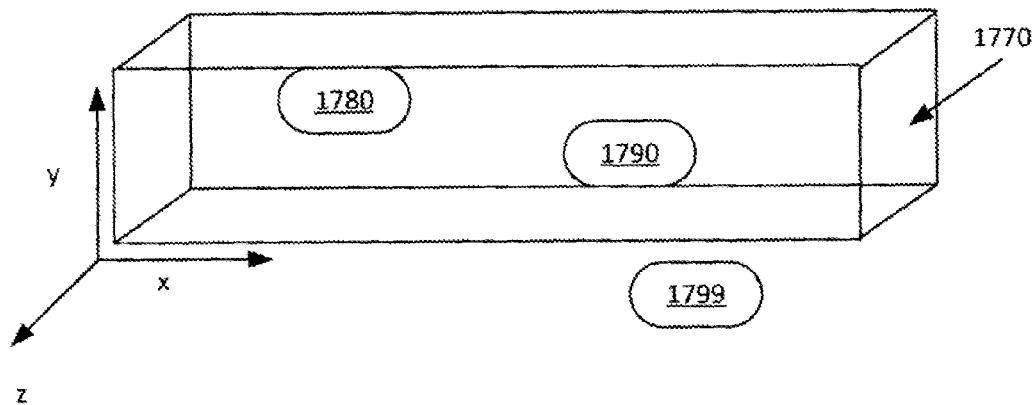

FIG. 17 illustrates an apparatus 1700 that supports detecting and responding to a hover angle. In one example, the apparatus 1700 includes an interface 1740 configured to connect a processor 1710, a memory 1720, a set of logics 1730, a proximity detector 1760, and a hover-sensitive i/o interface 1750. Elements of the apparatus 1700 may be configured to communicate with each other, but not all connections have been shown for clarity of illustration. The hover-sensitive input/output interface 1750 may be configured to report multiple (x,y,z) measurements for objects in a region above the input/output interface 1750. The set of logics 1730 may be configured to detect hover angles from the (x,y,z) measurements, to determine an intersection point, or to produce control events.

The proximity detector 1760 may detect an object 1780 in a hover-space 1770 associated with the apparatus 1700. The proximity detector 1760 may also detect another object 1790 in the hover-space 1770. The hover-space 1770 may be, for example, a three dimensional volume disposed in proximity to the i/o interface 1750 and in an area accessible to the proximity detector 1760. The hover-space 1770 has finite bounds. Therefore the proximity detector 1760 may not detect an object 1799 that is positioned outside the hover-space 1770. A user may place a digit in the hover-space 1770, may place multiple digits in the hover-space 1770, may place their hand in the hover-space 1770, may place an object (e.g., stylus) in the hover-space 1770, may make a gesture in the hover-space 1770, may remove a digit from the hover-space 1770, or take other actions. Apparatus 1700 may also detect objects that touch i/o interface 1750. The entry of an object into hover space 1770 may produce a hover-enter event. The exit of an object from hover space 1770 may produce a hover-exit event. The movement of an object in hover space 1770 may produce a hover-point move event. When an object comes in contact with the interface 1750, a hover to touch transition event may be generated. When an object that was in contact with the interface 1750 loses contact with the interface 1750, then a touch to hover transition event may be generated. Example methods and apparatus may interact with these and other hover and touch events.

Apparatus 1700 may include a first logic 1732 that is configured to handle a hover event associated with the object in the hover-space 1770. The hover event may be, for example, a hover enter event, a hover leave event, a hover move event, or other event. Handling the hover event may include producing first location data that identifies a first location in the hover space 1770 at which a first portion of the object is located. Handling the hover event may also include producing second location data that identifies a second location in the hover space 1770 at which a second portion of the object is located. When at least two portions of the object have been located in the hover-space 1770, the angle at which the object is interacting with the interface 1750 may be determined. For example, when a stylus is held in the hover space 1770, acquiring the three dimensional position of two locations on the stylus facilitate identifying the orientation and pitch of the stylus. Similarly, when a finger is present in the hover space 1770, acquiring the three dimensional position of the tip of the distal phalange and another portion of the distal phalange facilitate identifying the angle at which the finger is interacting with the interface 1750.

Apparatus 1700 may include a second logic 1734 that is configured to produce angle information from the first location data and the second location data. The angle information describes the angle at which the object is interacting with the interface 1750. In one embodiment, the angle information describes an angle at which the object intersects a normal of the input/output interface 1750. A normal of the input/output interface 1750 extends perpendicularly outward from the interface 1750. The normal may be positioned using the first location data or the second location data. In different embodiments, the first location data, the second location data, the hover data or the projection data may be described using Cartesian, cylindrical, polar co-ordinates, or spherical co-ordinates.

Apparatus 1700 may include a memory 1720. Memory 1720 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 1720 may be configured to store (x,y,z) position data for an object, angle information for an object, azimuth and altitude data for an object, user interface state information, characterization data, object data, or other data.

Apparatus 1700 may include a processor 1710. Processor 1710 may be, for example, a signal processor, a microprocessor, an application specific integrated circuit (ASIC), or other control and processing logic circuitry for performing tasks including signal coding, data processing, input/output processing, power control, or other functions. Processor 1710 may be configured to interact with the logics 1730. In one embodiment, the apparatus 1700 may be a general purpose computer that has been transformed into a special purpose computer through the inclusion of the set of logics 1730.

Figure 18:
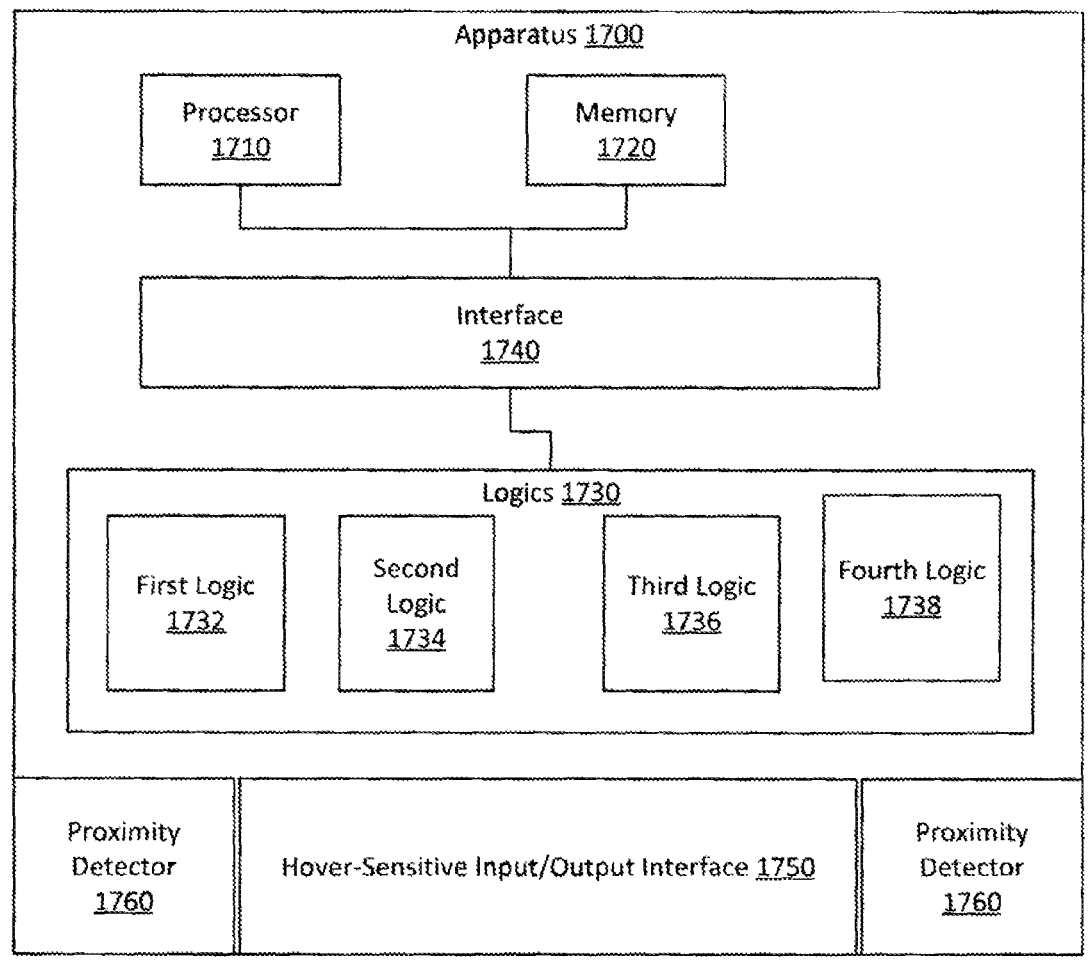
FIG. 18 illustrates an example apparatus configured to detect and respond to a hover angle.
Figure 18:
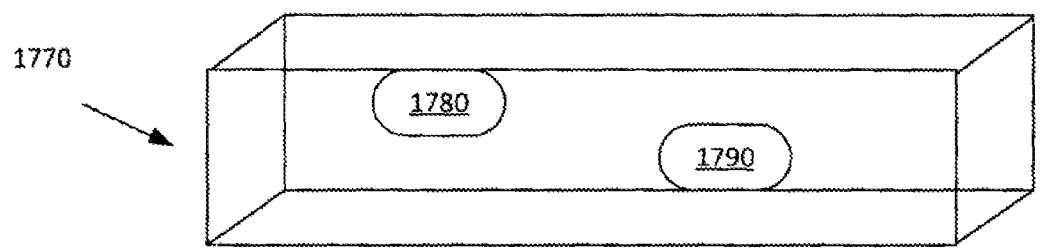

FIG. 18 illustrates another embodiment of apparatus 1700 (FIG. 17). This embodiment of apparatus 1700 includes a third logic 1736 that is configured to produce hover data describing a hover point associated with the object and the interface 1750. In one embodiment, the hover point may be positioned under the portion of the object that is closest to the interface 1750. In another embodiment, the hover point may be positioned based on analyzing the first location data and the second location data. For example, the hover point may be placed at the origin of a normal of the interface 1750 that intersects the mid-point of a line connecting the first location and the second location. The third logic 1736 may also be configured to produce projection data describing a projection point associated with the object and the interface 1750. The projection point may be located on or off the interface 1750. The projection point may be computed by determining the relationship of the object to the interface 1750 and then projecting a virtual line from the object down towards the interface 1750. In one embodiment, the projection point may be computed by extending a line connecting the first location and the second location until it intersects with the plane of the interface 1750. In one embodiment, the intersection may occur at a point on the interface 1750. In another embodiment, the intersection may occur at a point not located on the interface 1750.

This embodiment may also include a fourth logic 1738 that is configured to generate a control event based on the hover data or the projected data. The control event may be configured to control the appearance of a display on the input/output interface 1750. For example, if the intersection point is located near one edge of the interface 1750, the display may be re-oriented in that direction. If the intersection point is located beyond an edge of the interface 1750, a display on the interface 1750 may be scrolled in the direction of the intersection point at a rate determined by the angle. The control event may also be configured to control the operation of the input/output interface 1750. For example, if the intersection point is located over a volume control or brightness control then the volume produced by the interface 1750 may be changed or the brightness of the display may be changed. The rate of change may be determined by the angle. The control event may be configured to control the appearance of a user interface element on the input/output interface 1750. For example, a user interface item located within a threshold distance of the intersection point may be increased in size so that it is easier to interact with. The control event may be configured to control the operation of a user interface element on the input/output interface 1750. For example, user interface elements within a certain range of the intersection point may be activated while user interface elements outside the range may be de-activated to prevent inadvertent activations.

In one embodiment, the control event is a mouse over event. Thus, the intersection point can be used to move a "cursor" around on a display much in the same way that a mouse could be used to move a cursor around on the display.

Figure 19:
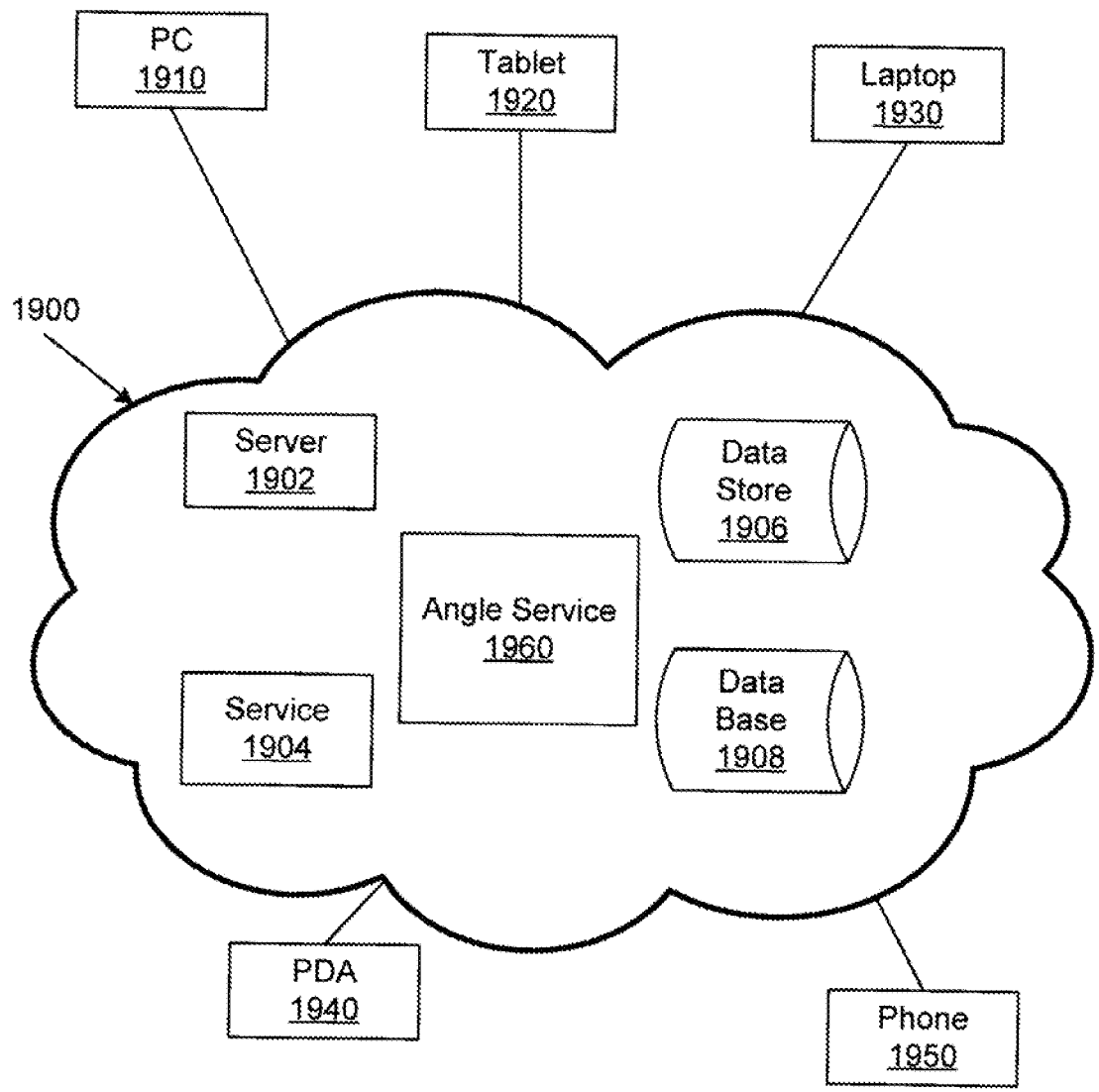
FIG. 19 illustrates an example cloud operating environment in which an apparatus configured to detect and respond to hover angles may operate.

FIG. 19 illustrates an example cloud operating environment 1900. A cloud operating environment 1900 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 19 illustrates an example angle service 1960 residing in the cloud. The angle service 1960 may rely on a server 1902 or service 1904 to perform processing and may rely on a data store 1906 or database 1908 to store data. While a single server 1902, a single service 1904, a single data store 1906, and a single database 1908 are illustrated, multiple instances of servers, services, data stores, and databases may reside in the cloud and may, therefore, be used by the angle service 1960.

FIG. 19 illustrates various devices accessing the angle service 1960 in the cloud. The devices include a computer 1910, a tablet 1920, a laptop computer 1930, a personal digital assistant 1940, and a mobile device (e.g., cellular phone, satellite phone) 1950. It is possible that different users at different locations using different devices may access the angle service 1960 through different networks or interfaces. In one example, the angle service 1960 may be accessed by a mobile device 1950. In another example, portions of angle service 1960 may reside on a mobile device 1950. Angle service 1960 may perform actions including, for example, computing angles, determining intersection points, handling events, producing events, or other actions. In one embodiment, angle service 1960 may perform portions of methods described herein (e.g., method 1500, method 1600).

Figure 20:
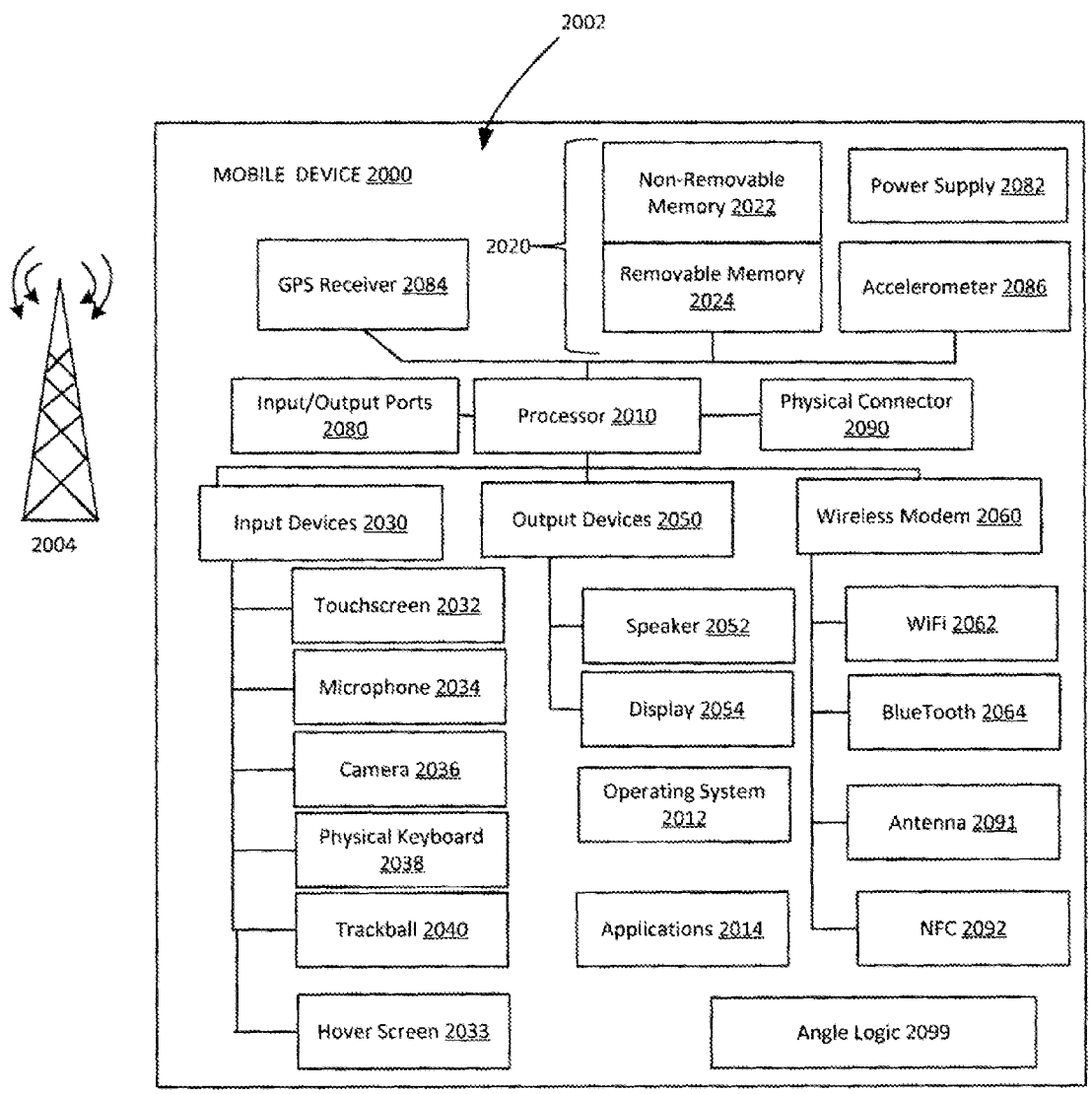
FIG. 20 is a system diagram depicting an exemplary mobile communication device configured to interact based, at least in part, on hover angle information.
Figure 21:
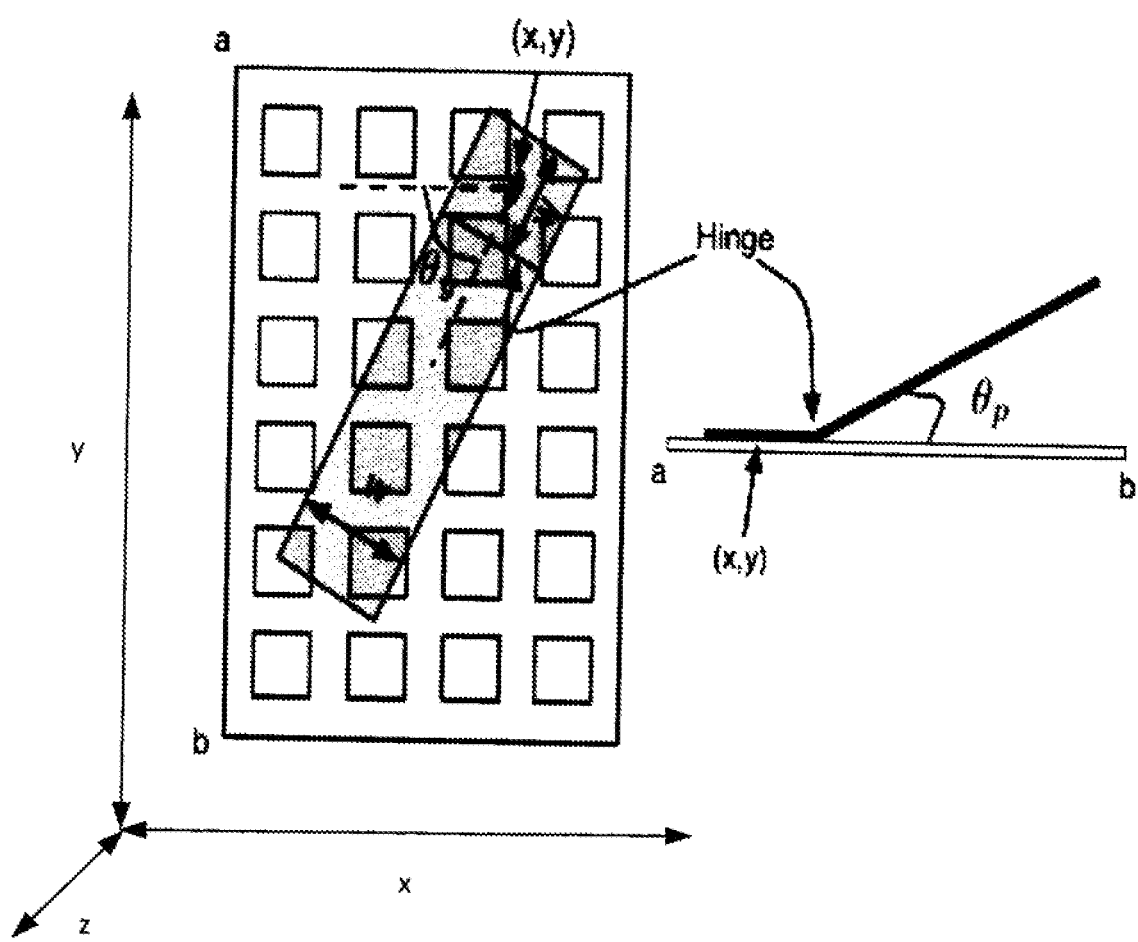
FIG. 21 illustrates an inference based touch system.

FIG. 20 is a system diagram depicting an exemplary mobile device 2000 that includes a variety of optional hardware and software components, shown generally at 2002. Components 2002 in the mobile device 2000 can communicate with other components, although not all connections are shown for ease of illustration. The mobile device 2000 may be a variety of computing devices (e.g., cell phone, smartphone, handheld computer, Personal Digital Assistant (PDA), etc.) and may allow wireless two-way communications with one or more mobile communications networks 2004, such as a cellular or satellite networks.

Mobile device 2000 can include a controller or processor 2010 (e.g., signal processor, microprocessor, application specific integrated circuit (ASIC), or other control and processing logic circuitry) for performing tasks including signal coding, data processing, input/output processing, power control, or other functions. An operating system 2012 can control the allocation and usage of the components 2002 and support application programs 2014. The application programs 2014 can include mobile computing applications (e.g., email applications, calendars, contact managers, web browsers, messaging applications), angle computation applications, or other applications.

Mobile device 2000 can include memory 2020. Memory 2020 can include non-removable memory 2022 or removable memory 2024. The non-removable memory 2022 can include random access memory (RAM), read only memory (ROM), flash memory, a hard disk, or other memory storage technologies. The removable memory 2024 can include flash memory or a Subscriber Identity Module (SIM) card, which is known in GSM communication systems, or other memory storage technologies, such as "smart cards." The memory 2020 can be used for storing data or code for running the operating system 2012 and the applications 2014. Example data can include (x,y,z) data, angle data, hover point data, touch point data, user interface element state, web pages, text, images, sound files, video data, or other data sets to be sent to or received from one or more network servers or other devices via one or more wired or wireless networks. The memory 2020 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 2000 can support one or more input devices 2030 including, but not limited to, a touchscreen 2032, a hover screen 2033, a microphone 2034, a camera 2036, a physical keyboard 2038, or trackball 2040. While a touch screen 2032 and a hover screen 2033 are described, in one embodiment a screen may be both touch and hover-sensitive. The mobile device 2000 may also support output devices 2050 including, but not limited to, a speaker 2052 and a display 2054. Other possible input devices (not shown) include accelerometers (e.g., one dimensional, two dimensional, three dimensional). Other possible output devices (not shown) can include piezoelectric or other haptic output devices. Some devices can serve more than one input/output function. For example, touchscreen 2032 and display 2054 can be combined in a single input/output device.

The input devices 2030 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 2012 or applications 2014 can comprise speech-recognition software as part of a voice user interface that allows a user to operate the device 2000 via voice commands. Further, the device 2000 can include input devices and software that allow for user interaction based on an intersection point derived from measurements of an object in a hover space.

A wireless modem 2060 can be coupled to an antenna 2091. In some examples, radio frequency (RF) filters are used and the processor 2010 need not select an antenna configuration for a selected frequency band. The wireless modem 2060 can support two-way communications between the processor 2010 and external devices. The modem 2060 is shown generically and can include a cellular modem for communicating with the mobile communication network 2004 and/or other radio-based modems (e.g., Bluetooth 2064 or Wi-Fi 2062). The wireless modem 2060 may be configured for communication with one or more cellular networks, such as a Global system for mobile communications (GSM) network for data and voice communications within a single cellular network, between cellular networks, or between the mobile device and a public switched telephone network (PSTN). Mobile device 2000 may also communicate locally using, for example, near field communication (NFC) element 2092.

The mobile device 2000 may include at least one input/output port 2080, a power supply 2082, a satellite navigation system receiver 2084, such as a Global Positioning System (GPS) receiver, an accelerometer 2086, or a physical connector 2090, which can be a Universal Serial Bus (USB) port, IEEE 1394 (FireWire) port, RS-232 port, or other port. The illustrated components 2002 are not required or all-inclusive, as other components can be deleted or added.

Mobile device 2000 may include an angle logic 2099 that is configured to provide a functionality for the mobile device 2000. For example, angle logic 2099 may provide a client for interacting with a service (e.g., service 1980, FIG. 19). Portions of the example methods described herein may be performed by angle logic 2099. Similarly, angle logic 2099 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    acquiring position data about a portion of an object located at least partially in a three-dimensional hover space produced by a portable apparatus having a hover-sensitive interface,
    where the position data is acquired solely by a passive capacitive sensing node that detects a capacitance change in the hover space caused by the object;
    where the position data describes the position of the object in the three-dimensional hover space, where a first dimension and a second dimension in the hover space define a plane that is parallel to the surface of the interface, where the second dimension is orthogonal to the first dimension, and where a third dimension in the hover space is orthogonal to both the first dimension and the second dimension and perpendicular to the plane;
    computing an angle at which the object is pitched with respect to the hover-sensitive interface based, at least in part, on the position data; and controlling the hover-sensitive interface based, at least in part, on the angle at which the object is pitched with respect to the hover-sensitive interface.

2. The method of claim 1, where the portable apparatus is a phone or tablet computer, and where the position data is acquired solely from a sensor located in the apparatus or solely from a sensor located on the apparatus.

3. The method of claim 2, where the angle is computed based on position data associated with two different portions of the object.

4. The method of claim 2, where the object is a finger and where the angle is computed based on position data for a distant phalange on the finger.

5. The method of claim 2, comprising establishing a hover point for the object based, at least in part, on information in the position data about the location of a portion of the object in the first dimension and the location of the object in the second dimension.

6. The method of claim 2, comprising establishing an intersection point for the object based, at least in part, on information in the position data about the location of the object in the first dimension, the location of the object in the second dimension, the location of the object in the third dimension, and on the angle.

7. The method of claim 6, comprising:
selectively controlling the appearance of the hover-sensitive interface based, at least in part, on the intersection point;
selectively controlling the operation of the hover-sensitive interface based, at least in part, on the intersection point, or
selectively controlling the operation of a user interface element on the hover-sensitive interface based, at least in part, on the intersection point.

8. The method of claim 7, where the hover-sensitive interface displays an item, and where controlling the appearance of the hover sensitive interface comprises re-orienting the item displayed on the hover-sensitive interface.

9. The method of claim 7, where controlling the appearance of the hover-sensitive interface includes dynamically reconfiguring a user interface element, where reconfiguring the user interface element includes changing an appearance of the user interface element, changing a position of the user interface element, changing an orientation of the user interface element, changing a size of the user interface element, or simulating a mouse-over event for the user interface element.

10. The method of claim 7, where controlling the operation of the hover-sensitive interface includes enhancing a functionality of a first user interface element located in an area within a threshold distance of the intersection point or diminishing the functionality of a second user interface element located beyond the threshold distance from the intersection point.

11. The method of claim 7, where controlling the operation of the user interface element includes controlling a direction of a graphical effect associated with the user interface element, controlling an intensity of a graphical effect associated with the user interface element, or controlling an area impacted by a graphical effect associated with the user interface element.

12. The method of claim 6, comprising:
fixing the intersection point;
acquiring second position data about the object, where the second position data is acquired solely by a passive capacitive sensing node that detects a capacitance change in the hover space caused by the object;
computing a second angle at which the object is pitched with respect to the hover-sensitive interface;
establishing a second intersection point for the object based, at least in part, on information in the second position data about the location of the object in the first dimension, the location of the object in the second dimension, the location of the object in the third dimension, and on the second angle; and
selectively controlling, based on a relationship between the intersection point and the second intersection point, the appearance of the hover-sensitive interface, the operation of the hover-sensitive interface, or the operation of the user interface element on the hover-sensitive interface.

13. The method of claim 2, comprising:
identifying a portion of the hover-sensitive interface that is occluded by the object based, at least in part, on the position data and the angle, and
selectively manipulating the portion of the hover-sensitive interface that is occluded by the object.

14. The method of claim 2, comprising:
acquiring second position data about a second object located in the three-dimensional hover space;
where the second position data is acquired solely by a passive capacitive sensing node that detects a capacitance change in the hover space caused by the second object;
computing a second angle at which the second object is pitched with respect to the hover-sensitive interface based, at least in part, on the second position data; and
controlling the hover-sensitive interface based, at least in part, on a relationship between the angle at which the first object is pitched with respect to the hover-sensitive interface and the second angle.

15. A computer-readable storage device storing computer-executable instructions that when executed by a computer cause the computer to perform a method, the method comprising:
acquiring position data about a portion of an object located at least partially in a three-dimensional hover space produced by a phone or tablet computer having a hover-sensitive interface,
where the position data is acquired by a passive capacitive sensing node that detects a capacitance change in the hover space caused by the object;
where the position data describes the position of the object in the three dimensional hover space, where a first dimension and a second dimension in the hover space define a plane that is parallel to the surface of the hover-sensitive interface, where the second dimension is orthogonal to the first dimension, and where a third dimension in the hover space is orthogonal to both the first dimension and the second dimension and perpendicular to the plane;
computing an angle at which the object is pitched with respect to the hover-sensitive interface based on the position data, where the angle is computed based on position data associated with two different portions of the object;
establishing a hover point for the object based, at least in part, on information in the position data about the location of a portion of the object in the first dimension and the location of the object in the second dimension;
establishing an intersection point for the object based, at least in part, on information in the position data about the location of the object in the first dimension, the location of the object in the second dimension, the location of the object in the third dimension, and on the angle;

identifying a portion of the hover-sensitive interface that is occluded by the object based, at least in part, on the position data and the angle, and selectively manipulating the portion of the hover-sensitive interface that is occluded by the object;
and selectively controlling the appearance of the hover-sensitive interface based, at least in part, on the angle, the hover point, and the intersection point, where controlling the appearance of the hover-sensitive interface comprises re-orienting an item displayed on the hover-sensitive interface, or dynamically reconfiguring a user interface element, where reconfiguring the user interface element includes changing an appearance of the user interface element, changing a position of the user interface element, changing an orientation of the user interface element, changing a size of the user interface element, or simulating a mouse-over event for the user interface element;

selectively controlling the operation of the hover-sensitive interface based, at least in part, on the angle, the hover point, and the intersection point, where controlling the operation of the hover-sensitive interface includes enhancing a functionality of a first user interface element located in an area within a threshold distance of the intersection point or diminishing the functionality of a second user interface element located beyond the threshold distance from the intersection point; or selectively controlling the operation of a user interface element on the hover-sensitive interface based, at least in part, on the angle, the hover point, or the intersection point, where controlling the operation of the user interface element includes controlling a direction of a graphical effect associated with the user interface element, controlling an intensity of a graphical effect associated with the user interface element, or controlling an area impacted by a graphical effect associated with the user interface element.

16. An apparatus, comprising:
a processor;
a hover-sensitive input/output interface;
a proximity detector configured to detect a portion of an object in a hover-space associated with the hover-sensitive input/output interface and to provide location data concerning the portion of the object, where the proximity detector includes a passive capacitive sensing node that detects a capacitance change in the hover-space;
a memory;
a set of logics configured to process events associated with the hover-space and the object; and
an interface configured to connect the processor, the hover-sensitive input/output interface, the proximity detector, the memory, and the set of logics;
the set of logics including:
   a first logic configured to handle a hover event associated with the object in the hover-space, where handling the hover event includes producing first location data that identifies a first location in the hover space at which a first portion of the object is located and producing second location data that identifies a second location in the hover space at which a second portion of the object is located,
   where the first location data and second location data are acquired passively by the hover-sensitive input/output interface using the passive capacitive sensing node; and
   a second logic configured to produce angle information from the first location data and the second location data, where the angle information describes an angle at which the object intersects a normal of the input/output interface.

17. The apparatus of claim 16, comprising:
a third logic configured to produce hover data describing a hover point associated with the object and the input/output interface and to produce a projection data describing a projection point associated with the object and the input/output interface; and
a fourth logic configured to generate a control event based on the hover data or the projected data.

18. The apparatus of claim 17, where the first location data, the second location data, the hover data or the projection data are described using Cartesian, cylindrical, polar co-ordinates, or spherical co-ordinates.

19. The apparatus of claim 17, where the control event is configured to control the appearance of a display on the input/output interface, to control the operation of the input/output interface, to control the appearance of a user interface element on the input/output interface, or to control the operation of a user interface element on the input/output interface.

20. The apparatus of claim 17, where the control event is a mouse over event.

* * * * *